United States Patent [19]
Jang et al.

[11] Patent Number: 5,749,806
[45] Date of Patent: May 12, 1998

[54] SYSTEM AND METHOD FOR CONTROLLING HYDRAULIC PRESSURE OF AN AUTOMATIC TRANSMISSION FOR VEHICLES

[75] Inventors: Jae Dirk Jang; Kibeen Lim, both of Kyungki-do, Rep. of Korea

[73] Assignee: Hyundai Motor Company, Seoul, Rep. of Korea

[21] Appl. No.: 656,436

[22] Filed: May 31, 1996

[30] Foreign Application Priority Data

May 31, 1995 [KR] Rep. of Korea ............ 95-14255

[51] Int. Cl.$^6$ .................................................. B60K 41/10
[52] U.S. Cl. .................................... 477/133; 477/132
[58] Field of Search ............................ 477/132, 133, 477/135, 144, 149

[56] References Cited

U.S. PATENT DOCUMENTS

| | | | |
|---|---|---|---|
| 4,142,613 | 3/1979 | Iijima | 477/133 |
| 4,617,841 | 10/1986 | Sugano | 477/135 |
| 4,637,281 | 1/1987 | Vanselous | 477/135 |
| 4,665,776 | 5/1987 | Sugano | 477/135 |
| 4,955,259 | 9/1990 | Narita | 477/163 |
| 5,046,174 | 9/1991 | Lentz et al. | 477/144 |
| 5,048,373 | 9/1991 | Sumimoto et al. | 477/133 |
| 5,092,199 | 3/1992 | Goto et al. | 477/133 |

FOREIGN PATENT DOCUMENTS 520618 3/1993 Japan.

*Primary Examiner*—Dirk Wright
*Attorney, Agent, or Firm*—Christie, Parker & Hale, LLP

[57] ABSTRACT

A hydraulic control system of an automatic transmission for a vehicle includes a line pressure control part for converting line pressure from a hydraulic pump into constant hydraulic pressure. A torque pressure generating part converts the constant hydraulic pressure fed from the line pressure control part via a manual valve into torque pressure in accordance with the operation of a transmission control unit. A torque pressure switching part switches the supply direction of the torque pressure fed from the torque pressure generating parts in accordance with the operation of the transmission control unit. A shift part primarily feeds the torque pressure fed from the torque pressure switching part to friction members and secondly feeds drive pressure to the friction members after converting the line pressure fed from the line pressure control means into drive pressure.

14 Claims, 17 Drawing Sheets

FIG.8

| Range | | C1 | C2 | C3 | B1 | B2 | B3 | B4 | F1 | F2 | F3 | Engine Brake |
|---|---|---|---|---|---|---|---|---|---|---|---|---|
| P | | | | | O | | | | | | | |
| R | | | O | | O | | O | | | | | O |
| N | | | | | O | | | | | | | |
| D (O/D ON) | 1 | O | | | O | | | | O | | F3 O | |
| | 2 | O | O | | O | O | | | | | O | |
| | 3 | O | O | | O | O | | | | O | O | O |
| | 4 | O | | O | | O | | | | | O | O |
| 3 (O/D OFF) | 1 | O | | | O | | | | O | | O | |
| | 2 | O | O | | O | O | | | | | O | O |
| | 3 | O | | | O | O | | | | O | O | O |
| 2 | 1 | O | | | O | | | | O | | O | |
| | 2 | O | | | O | O | | O | | O | O | O |
| 1 | 1 | O | | | O | | O | | O | | O | O |

SYSTEM AND METHOD FOR CONTROLLING HYDRAULIC PRESSURE OF AN AUTOMATIC TRANSMISSION FOR VEHICLES

BACKGROUND OF THE INVENTION

The present invention relates to a system and a method for controlling hydraulic pressure of an automatic transmission for a vehicle.

Generally, an automatic transmission provides necessary gear ratio to operate the vehicle under a wide range of speeds and loads. It does this with a minimum amount of effort on the part of the driver. That is, automatic upshifts and downshifts are a convenience for the driver because a foot-operated clutch is not required to shift gears and because the vehicle can be brought to a stop without the use of a clutch and without shifting the transmission into neutral.

A conventional automatic transmission for a vehicle comprises a torque converter having an impeller, a turbine and a stator, a gear train connected to the torque converter to provide various forward speed ranges a plurality of friction members such as disc clutches and one-way clutches which control gear action, and a hydraulic control system for controlling the operation of the friction members.

In the conventional automatic transmission, when a skip shift, e.g. from a fourth speed to a second speed or a third speed to a first speed is accomplished during high speed operation, since the shift control conditions at each of power OFF and ON modes are the same as each other, the skip shift operation is not smoothly accomplished. This results in shift shock.

For this reason, there is a need for a system and a method for controlling hydraulic pressure of an automatic transmission that can improve shift quality by controlling the skip shift according to the mode setting, that is, the power OFF and ON modes.

BRIEF SUMMARY OF THE INVENTION

The present invention is directed to a system and a method for controlling hydraulic pressure of an automatic transmission. Therefore, it is an object of the present invention to provide a hydraulic control system and method which can improve shift quality by smoothly accomplishing the skip shift operation according to a mode setting that is, power ON mode or power OFF mode.

According to one aspect of the present invention, a hydraulic control system of an automatic transmission for a vehicle comprises:

- a line pressure control means for converting line pressure from a hydraulic pump into constant hydraulic pressure;
- a torque pressure generating means for converting the constant hydraulic pressure fed from the line pressure control means via a manual valve into torque pressure in accordance with the operation of a transmission control unit;
- a torque pressure switching means for switching the supply direction of the torque pressure fed from the torque pressure generating means in accordance with the operation of the transmission control unit; and
- a shift means for primarily feeding the torque pressure fed from the torque pressure switching means to friction members and secondly for feeding drive pressure to the friction members after converting the line pressure fed from the line pressure control means into the drive pressure.

According to another aspect of the present invention, a method for controlling hydraulic pressure of an automatic transmission for a vehicle, comprises the steps of:

- determining a current speed ratio;
- detecting a power ON/OFF state through an ON/OFF switch manipulated by a driver;
- determining an opening of a throttle valve;
- changing the pressure applied to friction members related to the current speed ratio from drive pressure into torque pressure in response to a determined value of the power ON/OFF;
- interrupting the torque pressure to release the friction members;
- applying friction members related to a speed ratio lower than the current speed ratio with the torque pressure; and
- changing the pressure applied to the friction members related to the lower speed ratio from the torque pressure into the drive pressure, thereby completing a shift operation.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 8 is a table illustrating combinations of frictional members of the power train depicted in FIG. 1 at each speed ratio;

DETAILED DESCRIPTION

Figure 1:
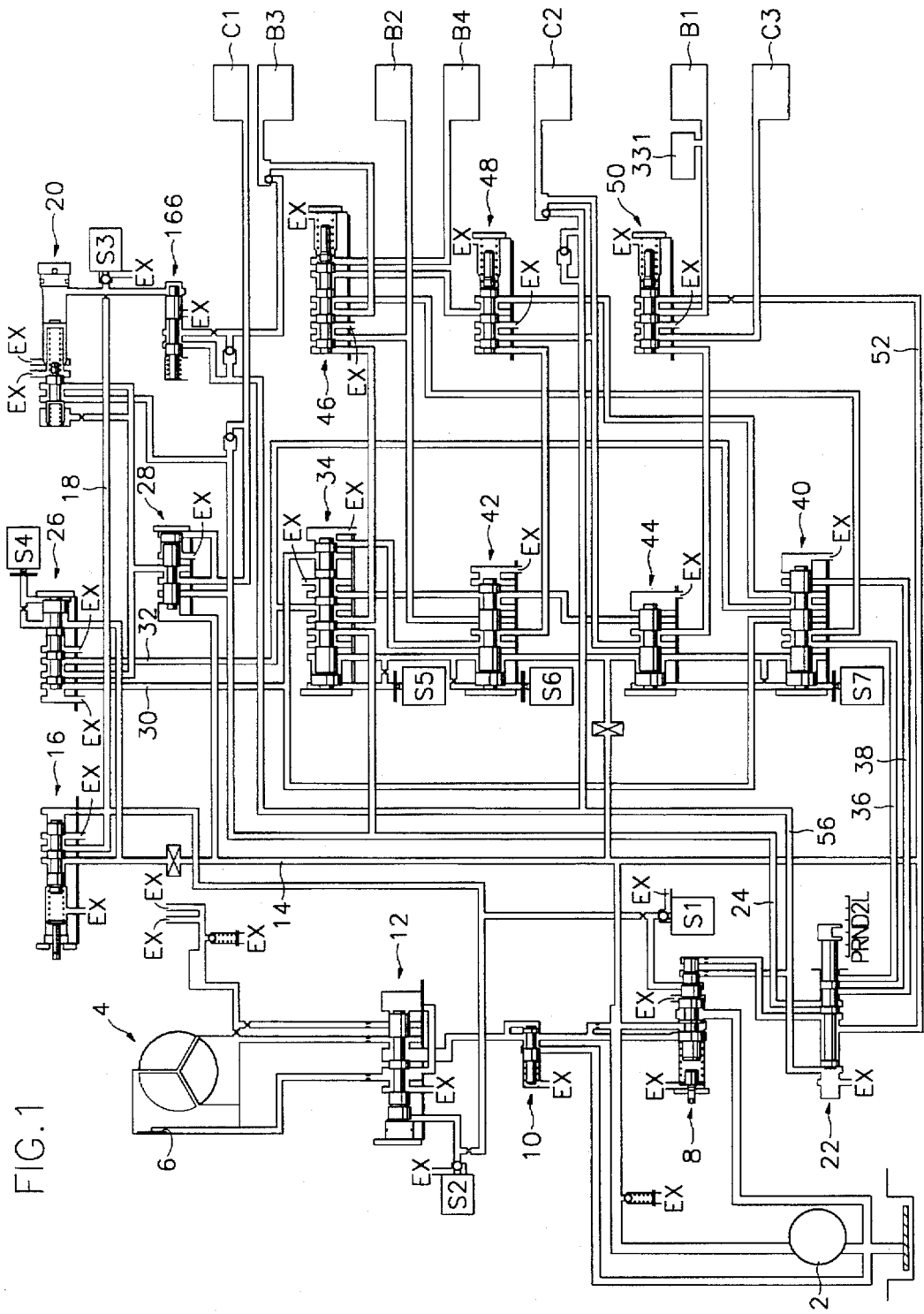
FIG. 1 is a hydraulic circuit diagram of an embodiment of the hydraulic control system according to a preferred embodiment of the present invention.

A preferred embodiment of the present invention will now be described in detail with reference to the accompanying drawings.

Certain terminology will be used in the following description for convenience and reference only and will not be limiting. The words "right" and "left" will designate directions in the drawings to which reference is made.

As used herein a shift directly from fourth speed ratio to second speed ratio is a skip downshift wherein one speed ratio (i.e., speed ratio) is skipped and a shift directly from third speed ratio to first speed ratio is a skip downshift where one speed ratio (i.e., speed ratio) is skipped. Further, torque pressure and drive pressure can both be applied to each friction member wherein the drive pressure is higher than the torque pressure.

Referring first to FIG. 1, a hydraulic control system according to a preferred embodiment of the present invention includes a hydraulic pump 2 driven by of an engine (not shown), a torque converter 4 for transmitting power of the engine to an input shaft of a transmission, a damper clutch 6 disposed in the torque converter for enhancing power transmission efficiency, a pressure regulator valve 8 for regulating hydraulic pressure generated from the hydraulic pump in response to the vehicle's driving conditions, a converter feed valve 10 feeding the hydraulic pressure passing through the pressure regulator valve 8 to the torque converter 4 as drive pressure and to each component requiring lubrication, and a converter clutch regulator valve 12 for controlling the operation of the damper clutch.

The pressure regulator valve 8 and converter clutch regulator valve 12 are respectively controlled by first and second solenoid valves S1 and S2 that are controlled by a transmission control unit ("TCU") (not shown).

The pressure regulator valve 8 is connected to a solenoid supply valve 16 through a line pressure passage 14. The solenoid supply valve 16 is connected to a third solenoid valve S3 through a passage 18 to supply hydraulic pressure thereto.

The third solenoid valve S3 is connected to a torque control regulator valve 20 to control the operation of the torque control regulator valve 20. The torque control regulator valve 20 is connected to a manual valve 22, which varies its ports in accordance with the position of a shift selector lever (not shown), through a drive pressure passage 24 to receive hydraulic pressure therefrom.

The torque control regulator valve 20 feeds torque pressure controlled by the third solenoid valve S3 to the control switch valve 26 and to an N-D control valve 28 that alleviates shift shock occurring during a manual shifting operation from a neutral range "N" to a drive "D" range.

The N-D control valve 28 first feeds torque pressure to a friction member C1 which is applied at an initial shifting operation together with a friction member B1, and then replaces the torque pressure with drive pressure by changing its ports, thereby alleviating shift shock.

The control switch valve 26 alternately feeds the torque pressure to first and second torque pressure passages 30 and 32 in accordance with the ON/OFF operation of a fourth solenoid valve S4 controlled by the TCU. The first and second torque pressure passages 30 and 32 both extend to a first-to-second speed shift valve 34 and a manual shift control valve 40. The first-to-second speed shift valve 34 feeds drive pressure fed from the drive pressure passage 24 to a friction member B2 in accordance with the ON/OFF operation of a fifth solenoid valve S5 controlled by the TCU. The manual shift control valve 40 is connected to the manual valve 22 to receive hydraulic pressure therefrom at both a second "2" range and a lockup "L" range.

A second-to-third speed shift valve 42, which varies its ports in accordance with the ON/OFF operation of a sixth solenoid valve S6 controlled by the TCU, feeds part of the hydraulic pressure being fed to the friction member B2 to a friction member C2 to accomplish a third speed. A third-to-fourth speed shift valve 44, which varies its ports in accordance with the operation of the manual shift control valve 40 controlled by a seventh solenoid valve S7, feeds part of the hydraulic pressure being fed to the friction member C2 to a friction member C3.

A second clutch valve 46 receiving hydraulic pressure from the first-to-second speed shift valve 34 at the second speed of the drive "D" range feeds the received hydraulic pressure to the friction member B2 as well as to the second-to-third speed shift valve 42. The second clutch valve 46 is also connected to both the manual shift valve 40 and a third clutch valve 48 to thereby feed each hydraulic pressure fed therefrom to both friction members B3 and B4.

The third clutch valve 48 receives hydraulic pressure from the second-to-third speed shift valve 42 and then feeds the received hydraulic pressure to the friction member C2 as well as to the third-to-fourth speed shift valve 44.

Further, a fourth clutch valve 50 receives hydraulic pressure from the third-to-fourth speed shift valve 44 and then feeds the received hydraulic pressure to the friction member C3 so that it can operate, and at the same time, the fourth clutch valve 50 feeds hydraulic pressure along a passage 52 to the friction member B1 which is designed to be applied at the first, second, third and fourth speeds of the drive "D" range.

The hydraulic control system described above will be described more in detail hereinbelow according to its function.

Figure 2:
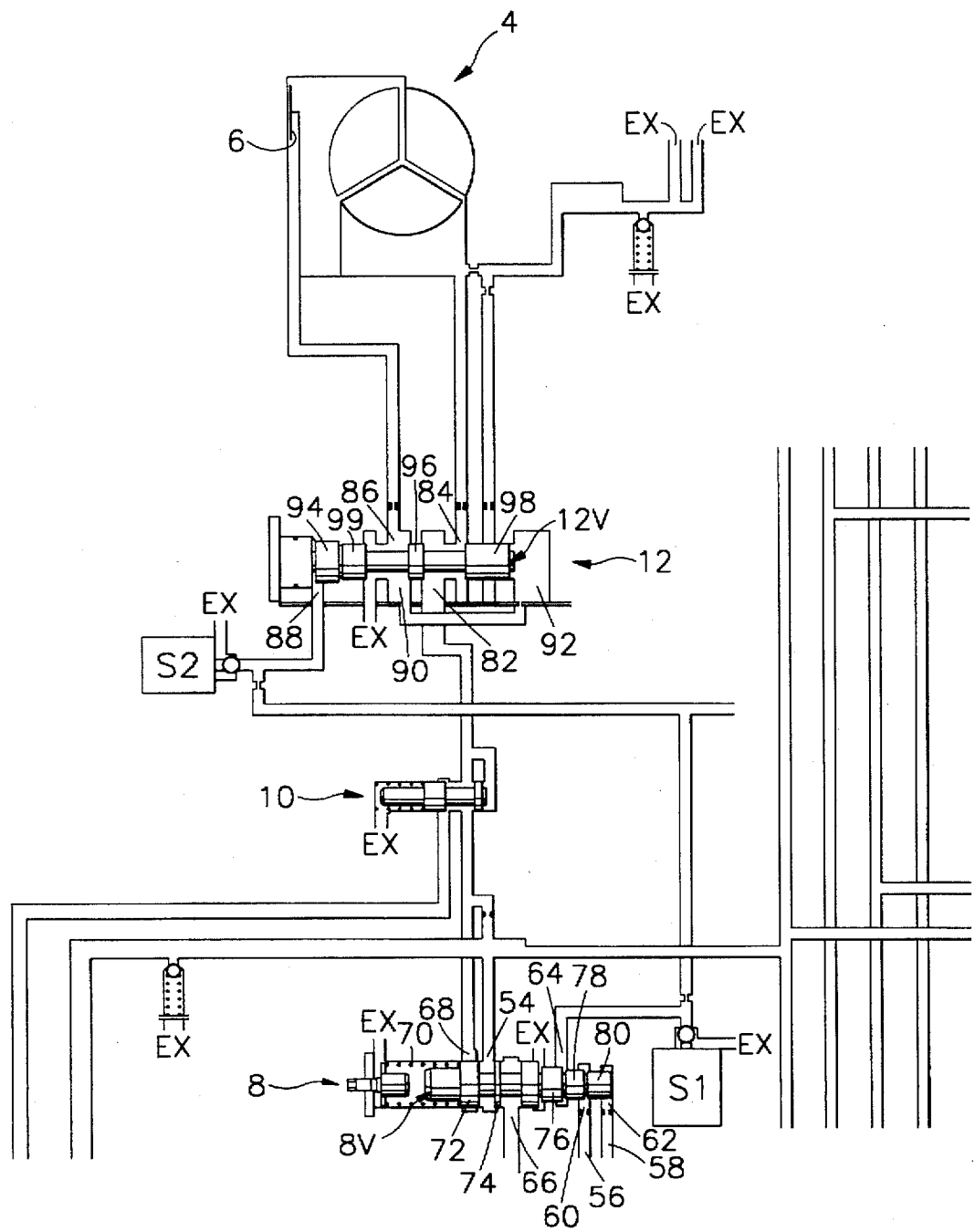
FIG. 2 is an enlarged hydraulic circuit diagram of a pressure regulator part depicted in FIG. 1.

Referring to FIG. 2 showing a pressure regulator part of the present hydraulic control system, the pressure regulator valve 8 is provided with a first port 54 for receiving hydraulic pressure produced by the hydraulic pump 2, a second port 60 connected to the manual valve 22 through a reverse pressure passage 56, a third port 62 connected to the manual valve 22 through a main passage 58, a fourth port 64 for receiving hydraulic pressure controlled by the first solenoid valve S1, a fifth port 66 for exhausting excessive hydraulic pressure, and a sixth port 68 for feeding hydraulic pressure to the converter feed valve 10.

The pressure regulator valve 8 comprises a valve spool 8V having a first land 72 biased by a spring 70 for opening and closing the sixth port 68, a second land 74 for adjusting the opening of the fifth port 66, and third 76, fourth, 78 and fifth 80 lands on which hydraulic pressure coming through each of the fourth, second and third ports 64, 60 and 62 acts, respectively.

The converter feed valve 10 is designed to receive hydraulic pressure from the first and sixth ports 54 and 68 and then feed the received hydraulic pressure to the converter clutch regulator valve 12.

The converter clutch regulator valve 12 controls the operation of the damper clutch 6 of the torque converter 4 and feeds oil to each component requiring lubrication in accordance with the operation of the second solenoid valve S2.

The converter clutch regulator valve 12 is provided with a first port 82 for receiving hydraulic pressure, a second port 84 for feeding damper clutch pressure to be applied to the torque converter 4, a third port 86 for feeding damper clutch release pressure to the torque converter 4, a fourth port 88 at which hydraulic pressure is formed or released by the operation of the second solenoid valve S2, and a fifth port 90 for feeding hydraulic pressure resisting against hydraulic pressure fed to the fourth port 88 to a hydraulic chamber 92.

The converter clutch regulator valve 12 comprises a valve spool 12V having a first land 94 on which hydraulic pressure coming through the fourth port 88 acts, a second land 96 for selectively communicating the first port 82 with the second or third ports 84 or 86, a third land 98 on which hydraulic pressure coming through the hydraulic chamber 92 acts, and a fourth land 99 for opening an exit port through which the torque converter pressure which has been applied and fed to the torque converter through the third port 86 is exhausted.

Figure 3:
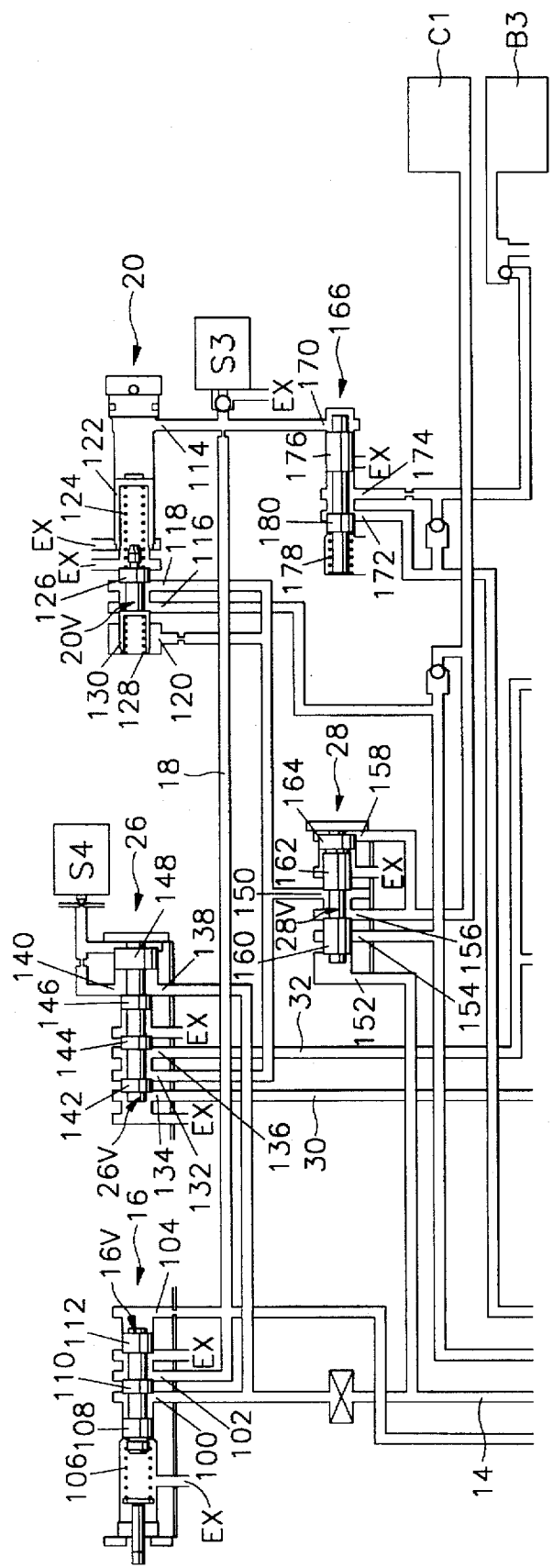
FIG. 3 is an enlarged hydraulic circuit diagram of a torque pressure control part depicted in FIG. 1.

Referring to FIG. 3 showing a torque pressure control part of the present hydraulic control system, the solenoid supply valve 16 for feeding line pressure from the pressure regulator valve 8 along the line pressure passage 14 to the first, second and third solenoid valves S1, S2 and S3 is provided with a first port 100 connected to the line pressure passage 14, a second port 102 for feeding hydraulic pressure coming through the first port 100 to the passage 18, a third port 104 receiving hydraulic pressure leaving through the second port 102 to vary the ports.

Further, the solenoid supply valve 16 comprises a valve spool 16V having a first land biased by a spring 106, a second land 110 for adjusting an opening of the second port 102, and a third land 112 on which hydraulic pressure coming through the third port 104 acts.

The torque control regulator valve 20 is provided with a first port 114 for receiving control pressure, a second port 116 for receiving hydraulic pressure from the manual valve 22 along the drive pressure passage 24, and third and fourth ports 118 and 120 to which hydraulic pressure coming through the second port 116 is selectively fed.

The torque control regulator valve 20 comprises a plug 122 biased by one end of a spring 124 and a valve spool 20V having a first land 126 biased by the other end of the spring 124 and a second land 130 biased by a spring 128.

The control switch valve 26 selectively receiving hydraulic pressure from the second and third ports 116 and 118 is provided with a first port 132 for receiving hydraulic pressure from the third port 118 of the torque control regulator valve 20, second and third ports 134 and 136 through which the hydraulic pressure coming through the first port 132 is selectively exhausted, a fourth port 138 for receiving hydraulic pressure from the line pressure passage 14, and a fifth port 140 for introducing hydraulic pressure resisting against the hydraulic pressure coming through the fourth port 138.

The control switch valve 26 comprises a valve spool 26V having a first land 142 for opening and closing the first and second ports 132 and 134, a second land 144 for opening and closing the first and third ports 132 and 136, a third land 146 on which hydraulic pressure coming through the fourth port 138 acts, and a fourth land 148 on which hydraulic pressure coming through the fifth port 140 acts.

The N-D control valve 28 is provided with a first port 150 for receiving torque pressure, a second port 152 for receiving line pressure, a third port 154 for receiving drive pressure, a fourth port 156 for feeding hydraulic pressure coming through the third port 154, and a fifth port 158 for receiving hydraulic pressure leaving through the fourth port 156 to thereby vary its ports.

The N-D control valve comprises a valve spool 28V having a first land 160 on which hydraulic pressure coming through the second port 152 acts, a second land 162 interrupting hydraulic pressure being fed to the first port 150, and a third land 164 interrupting hydraulic pressure being fed to the fifth port 158.

An N-R control valve 166 (neutral range to reverse range) feeds pressure to the friction member B3 in the reverse "R" range. The N-R control valve 166 is provided with a first port 170 for receiving control pressure of the third solenoid valve S3, a second port 172 for receiving reverse pressure from the manual valve 22 along the reverse pressure passage 56, and a third port 174 for feeding reverse pressure coming through the second port 172 to the friction member B3.

The N-R control valve 166 comprises a valve spool 166V having a first land 176 on which hydraulic pressure coming through the first port 170 acts and a second land 180 biased by a spring 178.

Figure 4:
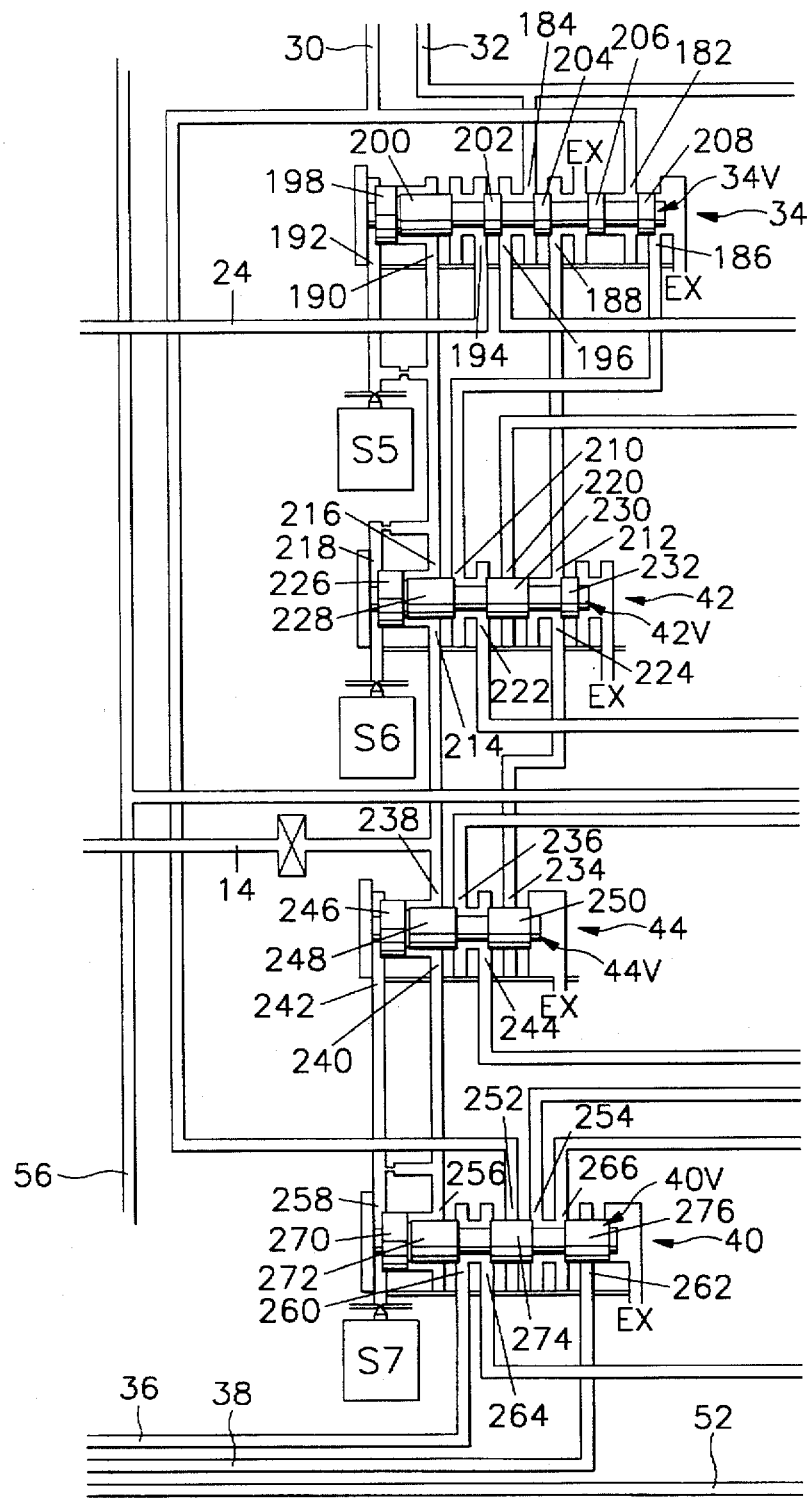
FIG. 4 is an enlarged hydraulic circuit diagram of a first shift control part depicted in FIG. 1.

Referring to FIG. 4 illustrating a first shift control part, the first-to-second speed shift valve 34, which feeds pressure to the friction member B3 during a shifting operation from the first speed to the second speed in the drive "D" range, is provided with first and second ports 182 and 184 for respectively receiving torque pressure from the first and second torque pressure passages 30 and 32.

The first-to-second speed shift valve 34 is further provided with a third port 186 for feeding hydraulic pressure coming through the first port 182 to the second-to-third speed shift valve 42, a fourth port 188 for feeding hydraulic pressure coming through the second port 184 to the second-to-third speed shift valve 42, a fifth port 190 for receiving hydraulic pressure from the line pressure passage 14 via the second-to-third speed shift valve 42, a sixth port 192, controlled by the ON/OFF operation of the fifth solenoid valve S5 for receiving hydraulic pressure leaving from the second-to-third speed shift valve 42, a seventh port 194 for receiving hydraulic pressure from the drive pressure passage 24, and an eighth port 196 for feeding hydraulic pressure coming through the seventh port 194 to the second clutch valve 46.

The first-to-second speed shift valve 34 comprises a valve spool 34V having a first land 198 on opposite faces of which each hydraulic pressure coming through each the fifth and sixth ports 190 and 192 respectively acts, a second land 200 on which hydraulic pressure coming through the seventh port 194 acts, a third land 202 for selectively connecting/disconnecting the seventh and eighth ports 194 and 196 with each other, a fourth land 204 for communicating the second port 184 alternately with the fourth or eighth port 188 or 196, a fifth land 206 on which part of the hydraulic pressure coming through the first port 182 acts, and a sixth land 208 on for selectively connecting/disconnecting the third port 186 with the hydraulic torque pressure in the first port 182.

The second-to-third speed shift valve 42, which feeds pressure to be applied to the friction member C2 during a shifting operation from the second speed to the third speed in the drive "D" range, is provided with a first port 210 connected to the third port 186 of the first to second speed shift valve 34 to receive hydraulic pressure therefrom, a second port 212 connected to the fourth port 188 of the first-to-second speed shift valve 34 to receive hydraulic pressure therefrom, a third port 214 for receiving hydraulic pressure from the line pressure passage 14, and a fourth port 216 for feeding hydraulic pressure coming through the third port 214 to the fifth and sixth ports 190 and 192 of the first-to-second speed shift valve 34.

The second-to-third speed shift valve 42 is further provided with a fifth port 218 for receiving hydraulic pressure controlled by the sixth solenoid valve S6, a sixth port 220 for receiving part of the hydraulic pressure which is being fed to the friction member B2, a seventh port 222 for feeding hydraulic pressure coming through either the first or sixth port 210 or 220, and an eighth port 224 for feeding hydraulic pressure coming through the second port 212 to the third-to-fourth speed shift valve 44.

The second-to-third speed shift valve 42 comprises a valve spool 42V having a first land 226 on opposite faces of which each of hydraulic pressure coming through each of the third and fifth ports 214 and 218 acts, a second land 228 on which part of the hydraulic pressure at the first port 210 acts, a third land 230 for communicating the seventh port 222 with the first or sixth ports 210 or 220, and a fourth land 232 for selectively connecting or disconnecting the second and eighth ports 212 and 224 with each other.

The third-to-fourth speed shift valve 44, which releases hydraulic pressure of the friction member B1 and feeds pressure to be applied to the friction member C3, is provided with a first port 234 for receiving hydraulic pressure from the eighth port 224 of the second-to-third speed shift valve 42, a second port 236 for receiving part of the hydraulic pressure which is being fed to the friction member C2, a third port 238 for receiving line pressure, and a fourth port 240 for feeding the line pressure to the manual shift valve 40.

The third-to-fourth speed shift valve 44 is further provided with a fifth port 242 for receiving hydraulic pressure controlled by the seventh solenoid valve S7, and a sixth port 244 for feeding hydraulic pressure coming through the first port 234 to the fourth clutch valve 50.

The third-to-fourth speed shift valve 44 comprises a valve spool 44V having a first land 246 on opposite faces of which hydraulic pressure coming through each of the third and fifth ports 238 and 242 acts, a second land 248 on which part of hydraulic pressure coming through the second port 236 acts, and for selectively connecting/disconnecting the second port 236 with the sixth port 244, and a third land 250 for selectively connecting/disconnecting the first and sixth ports 234 and 244 with each other.

The manual shift valve 40, which receives hydraulic pressure from the manual valve and feeds this hydraulic pressure to the friction members B3 and B4 as pressure in the second "2" and lockup "L" ranges is provided with first and second ports 252 and 254 communicating with the first and second torque pressure passages 30 and 32, respectively, a third port 256 for receiving line pressure from the fourth port 240 of the third-to-fourth speed shift valve 44, a fourth port 258 connected to the fifth port 242 of the third-to-fourth speed shift valve to receive line pressure controlled by the seventh solenoid valve S7, a fifth port 260 connected to the manual valve 22 by pressure passage 36 to receive hydraulic pressure in the second "2" range, and a sixth port 262 connected to the manual valve 22 by pressure passage 38 to receive hydraulic pressure in the lockup "L" range.

The manual shift valve 40 is further provided with a seventh port 264 for feeding hydraulic pressure to the second clutch valve 46 and an eighth port 266 for feeding hydraulic pressure coming through the second and sixth ports 254 and 262 to the third clutch valve 48.

The manual shift valve 40 comprises a valve spool 40V having a first land 270 on which line pressure acts, a second land 272 for opening and closing the fifth port 260, a third land 274 for selectively connecting and disconnecting the first and seventh ports 252 and 264 and a fourth land 276 for selectively communicating the eighth port 266 with the second or sixth port 254 or 262.

Figure 5:
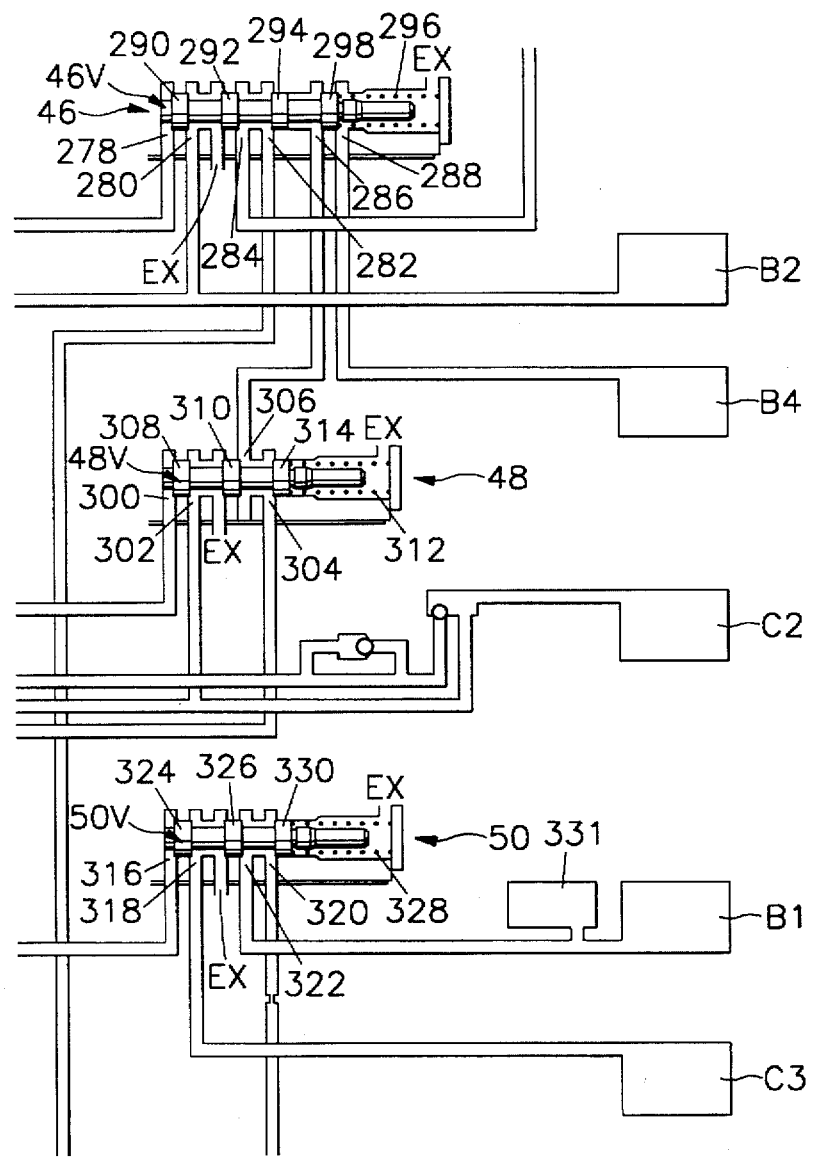
FIG. 5 is an enlarged hydraulic circuit diagram of a second shift control part depicted in FIG. 1.

Referring to FIG. 5 illustrating a second shift control part, the second clutch valve 46, which receives hydraulic pressure from the first-to-second speed shift valve 34 or the manual shift valve 40, is provided with a first port 278 for receiving hydraulic pressure from the first-to-second speed shift valve 34 and a second port 280 for feeding hydraulic pressure coming through the first port 278 to the friction member B2 and the second-to-third speed shift valve 42.

The second clutch valve 46 is further provided with a third port 282 for receiving hydraulic pressure from the seventh port 264 of the manual shift valve 40, a fourth port 284 for feeding hydraulic pressure coming through the third port 282 to the friction member B3, a fifth port 286 for receiving hydraulic pressure from the third clutch valve 48, and a sixth port 288 for feeding hydraulic pressure coming through the fifth port 286 to the friction member B4.

The second clutch valve 46 comprises a valve spool 46V having a first land 290 for selectively connecting the first and second ports 278 and 280 with each other, a second land 292 for selectively connecting the third and fourth ports 282 and 284 with each other, a third land 294 for separately connecting the fifth and third ports 286 and 282 with each other, and a fourth land biased by a spring 296 for selectively connecting and disconnecting the fifth port 286 to the sixth port 288.

The third clutch valve 48, which receives hydraulic pressure from the second-to-third speed shift valve 42 and feeds this hydraulic pressure to the friction member C2, is provided with a first port 300 for receiving hydraulic pressure from the second-to-third speed shift valve 42, a second port 302 for feeding hydraulic pressure coming through the first port 300 to the friction member C2 and the third-to-fourth speed shift valve 44, a third port 304 connected to the eighth port 266 of the manual shift valve 40 to receive hydraulic pressure therefrom, and a fourth port 306 for feeding hydraulic pressure coming through the third port 304 to the second clutch valve 46.

The third clutch valve 48 comprises a valve spool 48V having a first land 308 for selectively connecting the first and second ports 300 and 302 with each other, a second land 310 for selectively interconnecting the third and fourth ports 304 and 306, and a third land 314 biased by a spring 312.

The fourth clutch valve 50, which feeds line pressure to the friction member B1 in the first, second and third speeds of the drive "D" range and to the friction member C3 in the fourth speed, is provided with a first port 318 for receiving hydraulic pressure from the third-to-fourth speed shift valve 44, a second port 318 for feeding hydraulic pressure coming through the first port 316 to the friction member C3, a third port 320 for receiving hydraulic pressure from the line pressure passage 14, a fourth port 322 for feeding hydraulic pressure coming through the third port 320 to the friction member B1.

The fourth clutch valve 50 comprises a valve spool 50V having a first land 324 for selectively interconnecting the first and second ports 316 and 318, a second land 326 for selectively interconnecting the third and fourth ports 320 and 322, and a third land 330 biased by a spring 328.

Figure 6:
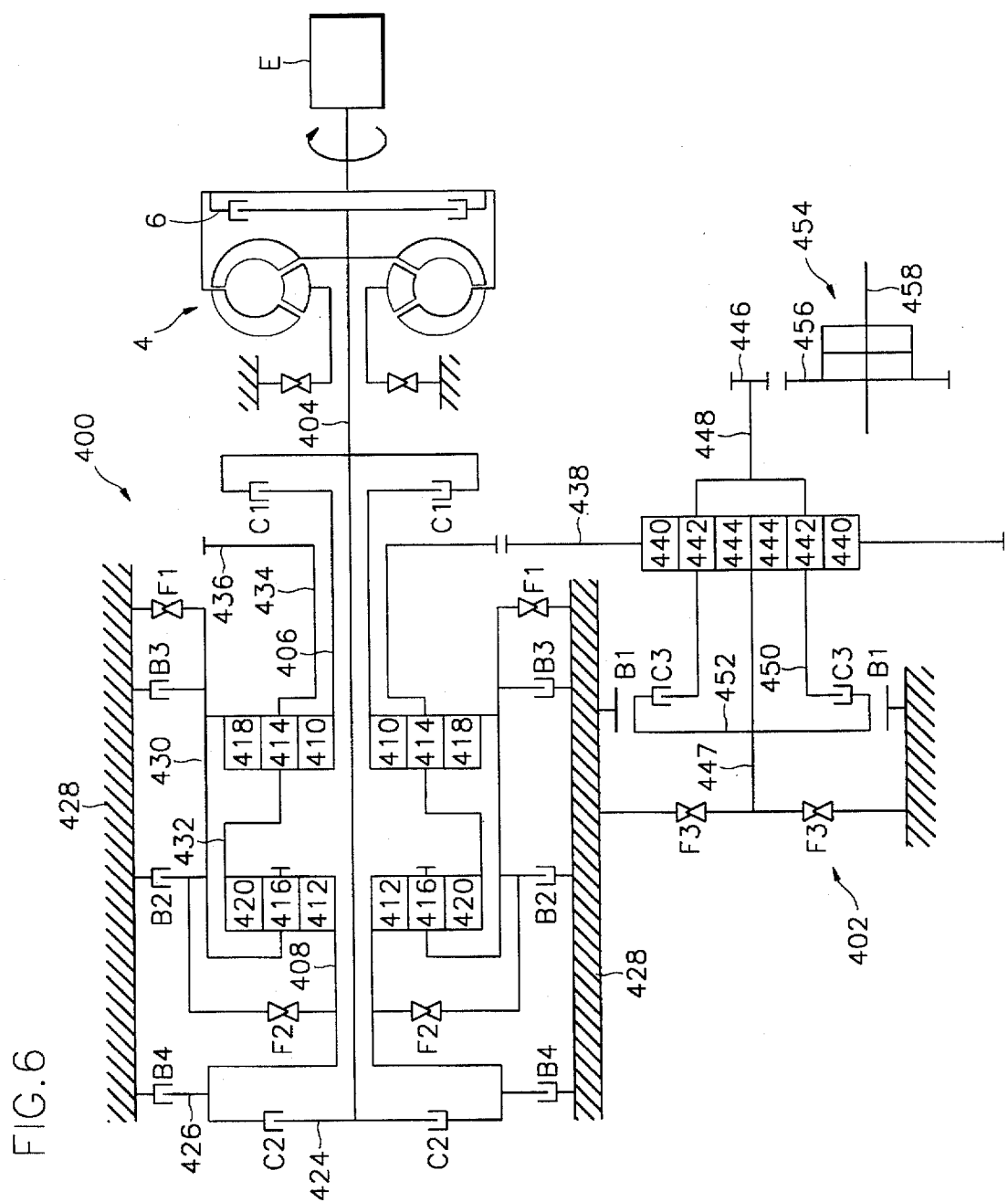
FIG. 6 is a schematic view showing a power train to which the hydraulic control system of the present invention is adapted.

FIG. 6 shows one example of a power train to which the hydraulic pressure control system of the present invention is adapted.

The power train comprises an engine E which is a power source, a torque converter 4 connected to a crankshaft of the engine E, a first shift part 400 composed of a planetary gear unit to convert torque from the torque converter into various speed ratios, and a second shift part 402 composed of a planetary gear unit to shift the speed ratio determined by the first shift part to various speed ratios.

The first shift part 400 includes a compound planetary unit, which is composed of two simple planetary gear units, disposed on a first shaft 404, second and third shafts 406 and 408 disposed around the first shaft 404, a first sun gear 410 disposed on the second shaft 406, a second sun gear 412 disposed on the third shaft 408, a first pinion gear 414 meshing with the first sun gear 410, a second pinion gear 416 meshing with the second sun gear 412, a first ring gear 418 meshing with the first pinion gear 414, and a second ring gear 420 meshing with the second pinion gear 416.

Further, the second and third shafts 406 and 408 are respectively connected to constitute a clutch hook-up, such that the first and second sun gears 410 and 412 can be input elements when the friction members C1 and C2 are applied. The first ring gear 418 becomes selectively a reacting element in accordance with the operation of the friction members B2 and B3. The second sun gear 412 becomes a reacting element by the friction member B4.

The second pinion gear 416 is connected to the first ring gear 418 through the second power transmission member 430. The second pinion gear 416 and the first ring gear 418 are restricted in their rotation in a counterclockwise direction when viewed from the engine side. In addition, they are restricted in a clockwise or counterclockwise direction by the friction members B2 and B3.

In addition, the second ring gear 420 is connected to the first pinion gear 414 through the third power transmission member 432 to transmit power controlled in the first shift part 400 to the first output gear 436 through the fourth power transmission member 434.

The one way clutch F1 prevents the second pinion gear 416 from rotating in an opposite direction of the rotating direction of the engine to make the second pinion gear 416 a reacting element by the second power transmission member 430 in the first speed of each of the drive, second and lockup ranges "D", "2" and "L". The fourth power transmission member 434 is provided with the first output gear 436 of the first shift part 400. The first output gear 436 meshes with an input gear 438 of the second shift part 402.

The third shaft 408 is connected to the power transmission member 430 through the second one way clutch F2, and to the friction member B2 through the second one way clutch F2.

The second shift part 402 receiving power from the first output gear 436 of the first shift part 400 comprises a third ring gear 440 on the outer circumference of which the input gear 438 is disposed, a third pinion gear 442 disposed on the inner circumference of the third ring gear 440, and a third sun gear 444 on the outer circumference of which the third pinion gear is disposed.

The third pinion gear 442 is connected to the second output gear 446 through a fifth power transmission member 448. The fifth power transmission member 448 is selectively connected to a fourth shaft 447 rotating together with the third sun gear 444 through the fourth friction member C3.

A hub 452 which is integrally formed with the fourth shaft 447 can be operated as a reacting element by the friction member B1. In addition, the fourth shaft 447 is restricted in its rotation by the third one way clutch F3 in a counterclockwise direction when viewed from the engine side. The second output gear 446 meshes with the final reduction gear 456 of the differential 454.

The shift operation in the hydraulic control system and the power train will be described hereinafter.

When the engine operates in the neutral "N" range, the solenoid valve S1 is controlled to an OFF state by the TCU to vary hydraulic pressure fed to the fourth port 64 of the pressure regulator valve 8. Accordingly, since the hydraulic pressure acting on the third land 76 is increased or decreased, the fifth port 66 is selectively connected to the first port 54 hydraulic pressure generated from the hydraulic pump 2 is exhausted or interrupted.

By the above operation, the line pressure is regulated and fed to the first port 100 of the solenoid supply valve 16 and then leaves through the second port 102. Part of the hydraulic pressure leaving through the second port 102 is fed to the third port 104 to act on the right face of the third land 112, thereby displacing the valve spool 16V of the solenoid supply valve 16 toward the left.

Therefore, the second land 110 partly closes the second port 102 so that hydraulic pressure fed from the second port 102 to the third port 104 is lowered, whereby the valve spool 16V is displaced toward the right by the elastic force of the spring 106.

As this operation is repeatedly performed, the hydraulic pressure leaving through the second port 102 is fed to the first port 114 of the torque control regulator valve 20. The hydraulic pressure coming through the first port 114 is regulated by the ON/OFF operation of the third solenoid valve S3 to control the position of the plug 122. When the third solenoid valve S3 is controlled to an OFF state, the plug 122 is displaced toward the left while compressing the spring 124 so that the valve spool 20V can be displaced toward the left.

Figure 9:
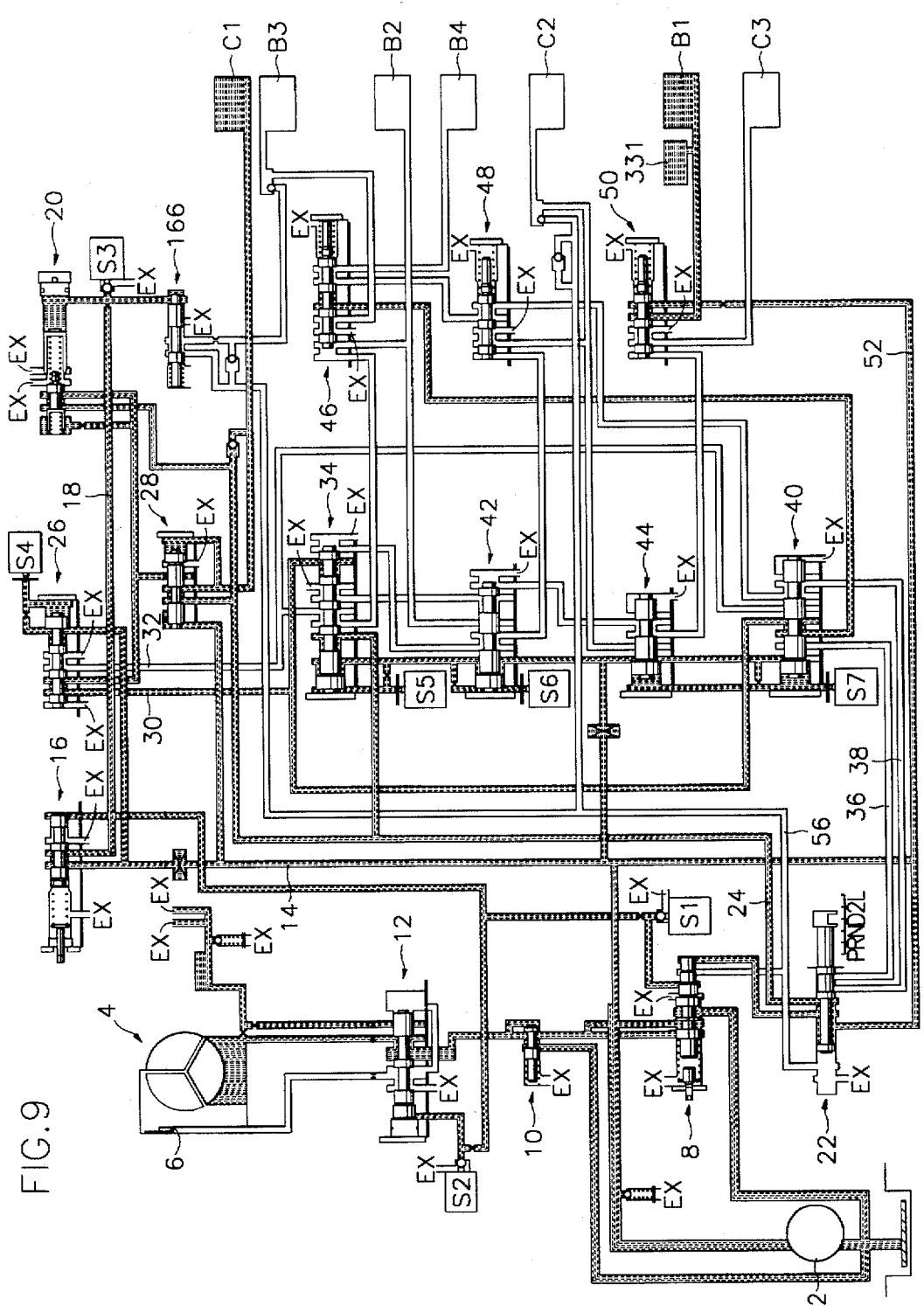
FIG. 9 is the hydraulic circuit diagram of FIG. 1 showing the location of hydraulic pressure during the first speed of the drive "D" range.

FIG. 9 shows the hydraulic circuit diagram of FIG. 1 showing the location of hydraulic pressure during the first speed of the drive "D" range.

In the above, when the shift mode is changed from the neutral range "N" to the drive "D" range, part of the hydraulic pressure of the line pressure passage 14 is fed to the friction member B1 through the third and fourth ports 320 and 322 of the fourth clutch valve 50.

Further, the rest of the hydraulic pressure flows along the drive pressure passage 24 via the manual valve 22 and is then fed to the first port 116 of the torque control regulator valve 20.

At this point, by the above operation, the second port 116 is to be connected to the third port 118 so that the hydraulic pressure coming through the second port 116 can leave through the third port 118.

The hydraulic pressure leaving through the third port 118 is fed to both the first port 132 of the control switch valve 26 and the first port 150 of the N-D control valve 28.

At this point, part of the hydraulic pressure within the line pressure passage 14 is fed to the N-D control valve 28 to displace the valve spool 28V toward the right such that the first and fourth ports 150 and 156 of the N-D control valve 28 are to be interconnected.

Accordingly, the hydraulic pressure fed from the torque control regulator valve 20 to the first port 150 of the N-D control valve 28 leaves through the fourth port 156 and is then fed to the friction member C1.

That is, the friction member C1 first starts its application by torque pressure. At this point, part of the hydraulic pressure leaving through the fourth port 156 of the N-D control valve 28 acts on the right face of the third land 164 so that the valve spool 28V of the N-D control valve 28 is displaced toward the left.

By this operation, the third and fourth ports 154 and 156 of the N-D control valve 28 are connected such that drive pressure coming through the third port 154 from the manual valve 22 is fed to the friction member C1, whereby the pressure applied to the friction member C1 is changed from the torque pressure to the drive pressure while accomplishing the first speed.

As described above, when the friction members B1 and C1 are applied, power of the first shaft 404 is at the power train inputted to the first sun gear 410 through the second shaft 406.

Figure 7:
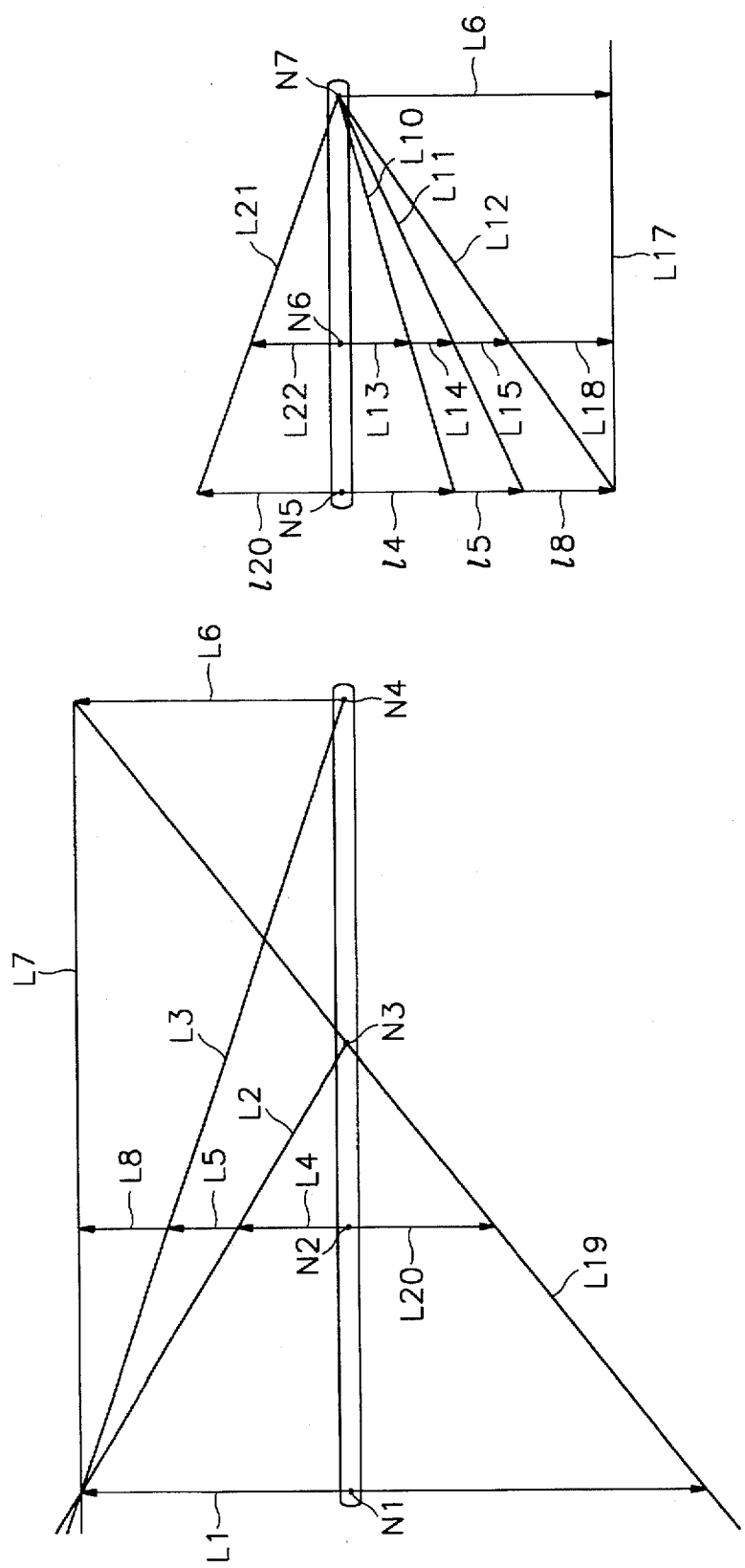
FIG. 7 is a graphical illustration of the speed ratio output from the power train of FIG. 6 by lever analogy.

Therefore, as shown in FIG. 7 showing lever analogy, the first sun gear 410 works as an input element at a first node N1, the first ring gear 418 works as a reacting element at a third node N3 by the operation of the one way clutch F1, and the fourth power transmission member 434 works as an output element at a second node N2. As a result, a vertical line connecting a line L2, which connects a reference level of an input speed line L1 of the first node N1 to the third node N3 to the second node N2, becomes a first output speed line L4 of the first shift part 400.

The resultant speed ratio is transmitted to the input gear 438 of the second shift part 402.

In the second shift part 402, the third ring gear 440 works as an input element at a fifth node N5, the third sun gear 444 works as a reaction element at a seventh node N7 by the friction member B1, and the fifth power transmission member 448 works as an output element at a sixth node N6. As a result, as shown in FIG. 7, a vertical line connecting a straight line L10, which connects input speed line 14 of a fifth node N5 to a seventh node N7 to a sixth node N6, becomes a first output speed line of the second shift part 402.

The output of the second shift part 402 becomes the final first output speed in the transmission. This first output speed is finally reduced by gear ratio of the second output gear 446 and the final reduction gear 456 to drive a vehicle axle 458 through a differential 454.

Figure 10:
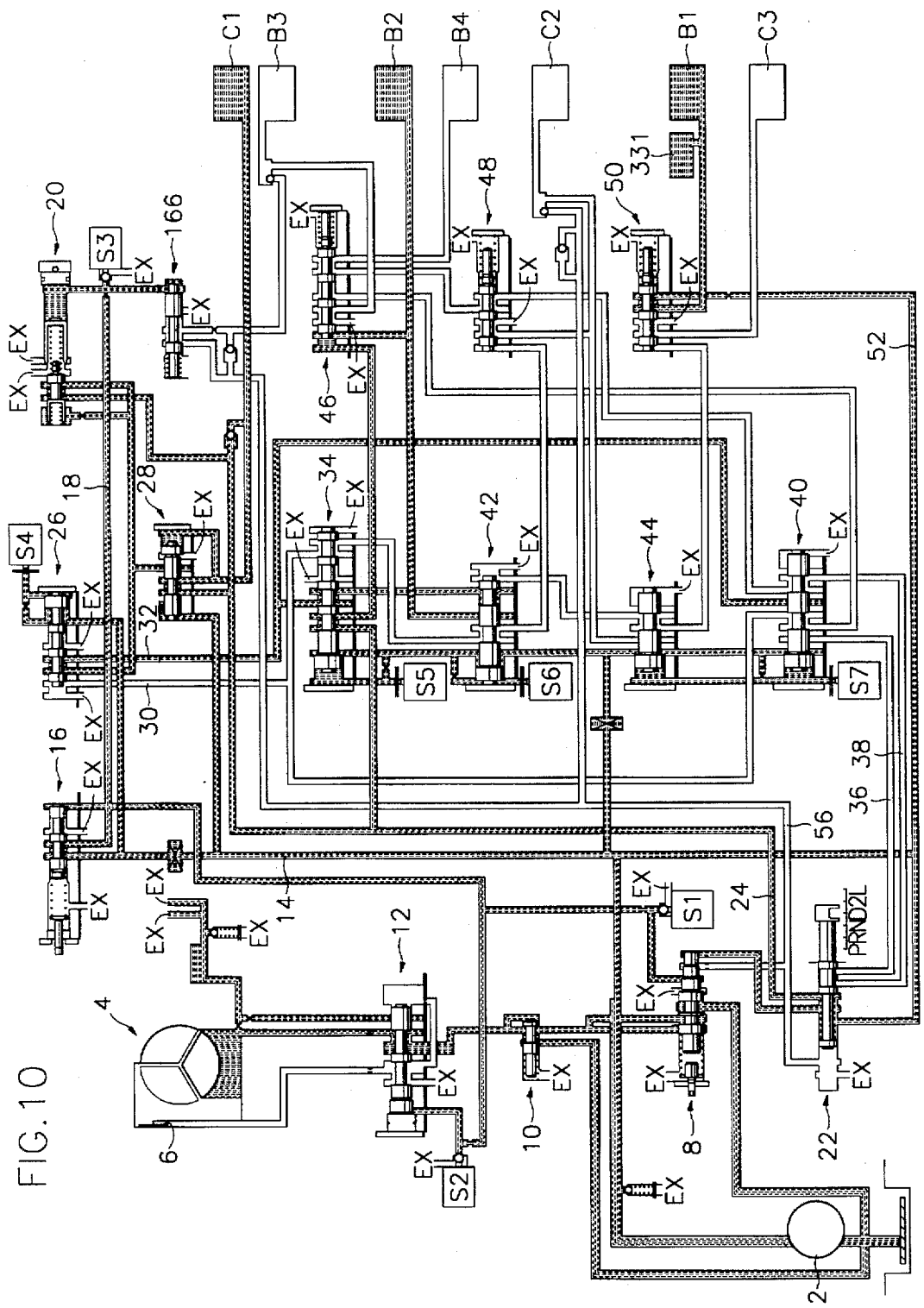
FIG. 10 is the hydraulic circuit diagram of FIG. 1 showing the location of hydraulic pressure during the second speed of the drive "D" range.

FIG. 10 shows the hydraulic circuit diagram of FIG. 1 showing the location of hydraulic pressure during the second speed of the drive "D" range.

When the speed of the vehicle is gradually increased in the first speed state, the fourth solenoid valve S4 is controlled to an ON state to displace the valve spool 26V of the control switch valve 26 toward the right.

By this operation, torque pressure fed to the first port 132 is fed to the second port 184 of the first-to-second speed shift valve 34 along the second torque pressure passage 32 through the third port 136.

At this point, since the valve spool 34V of the first-to-second speed shift valve 34 maintains its leftward state as shown in FIG. 9, the hydraulic pressure coming through the second port 184 leaves through the eighth port 196 and is then fed to the first port 278 of the second clutch valve 46.

Therefore, in the second clutch valve 46, since the torque pressure acts on the first land 290 of the valve spool 46V to displace it toward the right while overcoming the elastic force of the spring 296, the first port 278 is connected to the second port 280 such that the torque pressure coming through the first port 278 can be fed to the friction member B2 through the second port 280, thereby starting the shift from the first speed to the second speed.

At this state, as the fifth solenoid valve S5 is controlled to an OFF state, the valve spool 34V of the first-to-second speed shift valve 34 is displaced toward the right to connect the seventh port 194 with the eighth port 196 so that the drive pressure coming through the seventh port 194 is fed to the eighth port 196.

That is, the friction member B2 is applied by the torque pressure in the initial shifting operation and is then applied by the drive pressure to thereby complete the control of the second speed.

As described above, when the friction members B1, C2, B2 are applied, power of the first shaft 404 is inputted to the first sun gear 410 through the second shaft 406.

Therefore, the first sun gear 410 works as an input element at the first node N1, the second sun gear 412 works as a reacting element at the node N4 by the friction member B2, and the fourth power transmission member 434 works as an output element at the second node N2. As a result, a vertical line connecting a straight line L3, which connects the reference level of the input speed line L1 of the first node L3 to the fourth node N4, to the second node N2 becomes a second output speed line L5.

The resultant speed ratio is transmitted to the input gear 438 of the second shift part 402.

In the second shift part 402, the third ring gear 440 works as an input element at the fifth node N5, the third sun gear 444 works as a reaction element at the seventh node N7 by the friction member B1, and the fifth power transmission member 448 works as an output element at a sixth node N6. As a result, a line connecting a straight line L21, which connects the input speed line 120 of a fifth node N5 to a seventh node N7 to a sixth node N6, becomes a second output speed line L22 of the second shift part 402.

The output of the second shift part 402 becomes the final second output speed in the transmission. This second output speed is finally reduced by gear ratio of the second output gear 446 and the final reduction gear 456 to drive a vehicle axle 458 through a differential 454 with the first speed.

Figure 11:
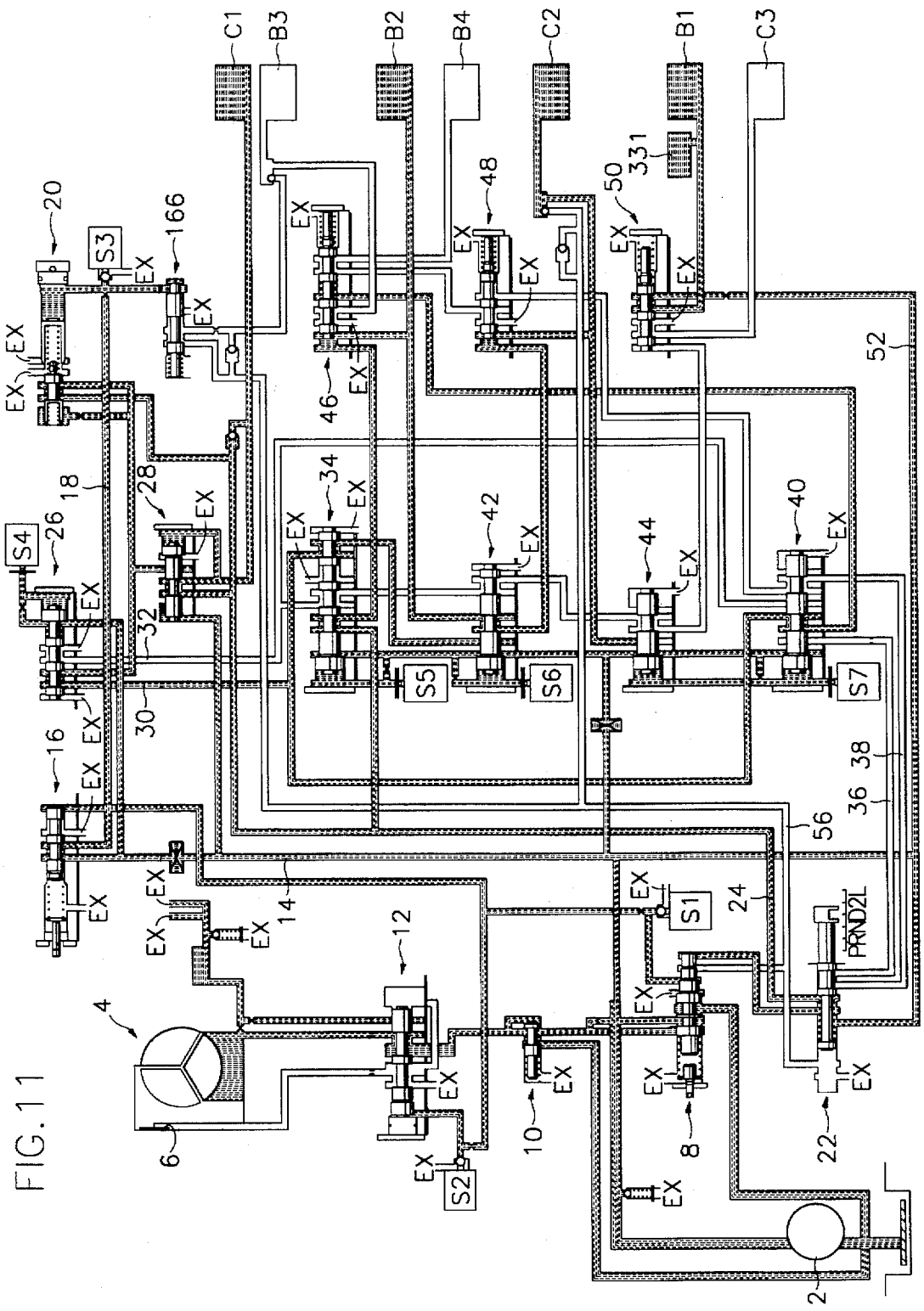
FIG. 11 is the hydraulic circuit diagram of FIG. 1 showing the location of hydraulic pressure during the third speed of the drive "D" range.

FIG. 11 is the hydraulic circuit diagram of FIG. 1 showing the location of hydraulic pressure during the third speed of the drive "D" range. When the speed of the vehicle is gradually increased in the second speed state, the fourth solenoid valve S4 is controlled to an OFF state to displace the valve spool 26V of the control switch valve 26 toward the left.

By this operation, torque pressure fed to the first port 132 is fed to the first port 182 of the first-to-second speed shift valve 34 along the first torque pressure passage 30 through the second port 134.

At this point, since the valve spool 34V of the first-to-second speed shift valve 34 maintains its rightward state, the hydraulic pressure coming through the first port 182 leaves through the third port 186 and is then fed to the first port 210 of the second-to-third speed shift valve 42. Therefore, in the second-to-third speed shift valve 42, since the valve spool 42V is displaced toward the left (as shown in FIG. 4), the first port 210 is connected to the seventh port 222 such that torque pressure coming through the first port 210 leaves through the seventh port 222 and is then fed to the first port 300 of the third clutch valve 48.

At this point, since the torque pressure acts on the first land 308 of the valve spool 48V of the third clutch valve 48, the valve spool 48V is displaced toward the right while overcoming the elastic force of the spring 312 so that the first and second ports 300 and 302 can be interconnected. As a result, the torque pressure coming through the first port 300 is primarily fed to the friction member C2 through the second port 302, thereby starting the shift operation from the second speed to the third speed.

At this state, as the sixth solenoid valve S6 is controlled to an OFF state (S5 is already off), the valve spool 42V of the second-to-third speed shift valve 42 is displaced toward the right as shown in FIG. 11 to connect the sixth port 220 with the seventh port 222 so that the torque pressure which is being fed to the first port 210 is obstructed and the drive pressure coming through the sixth port 220 is fed to the friction member C2 through the seventh port 222.

That is, the friction member C2 is applied by the torque pressure in the initial shifting operation and is then applied by the drive pressure to thereby complete the control of the third speed.

As described above, when the friction members B1, C1, B2, and C2 are applied, power of the first shaft 404 is inputted to the first and second sun gears 410 and 412 through the second and third shafts 406 and 408, respectively.

The first and fourth nodes N1 and N4 become the locations of the input elements, and the node N2 becomes the output element. Therefore, the planet gear units constituting the first shift part 400 are locked, such that a vertical line connecting a straight line L7, which connects the reference level of the input speed line L1 of the first node N1 to the reference level of the input speed line of the fourth node N4, to the second node N2 becomes a third output speed line L8.

Accordingly, the speed ratio in the first shift part 400 is transmitted to the input gear 438 of the second shift part 402.

In the second shift part 402, the third ring gear 440 works as an input element at the fifth node N5, the third sun gear 444 works as a reaction element at the seventh node N7 by the friction member B1, and the fifth power transmission member 448 works as an output element at a sixth node N6. As a result, as shown in FIG. 7, a line connecting a straight line L12, which connects the input speed line 18 of a fifth node N5 to a seventh node N7, to a sixth node N6 becomes a third output speed line L15 of the second shift part 402.

The output of the second shift part 402 becomes the final third output speed in the transmission. This third output speed is finally reduced by gear ratio of the second output gear 446 and the final reduction gear 456 to drive a vehicle axle 458 through a differential 454 with the third speed.

Figure 12:
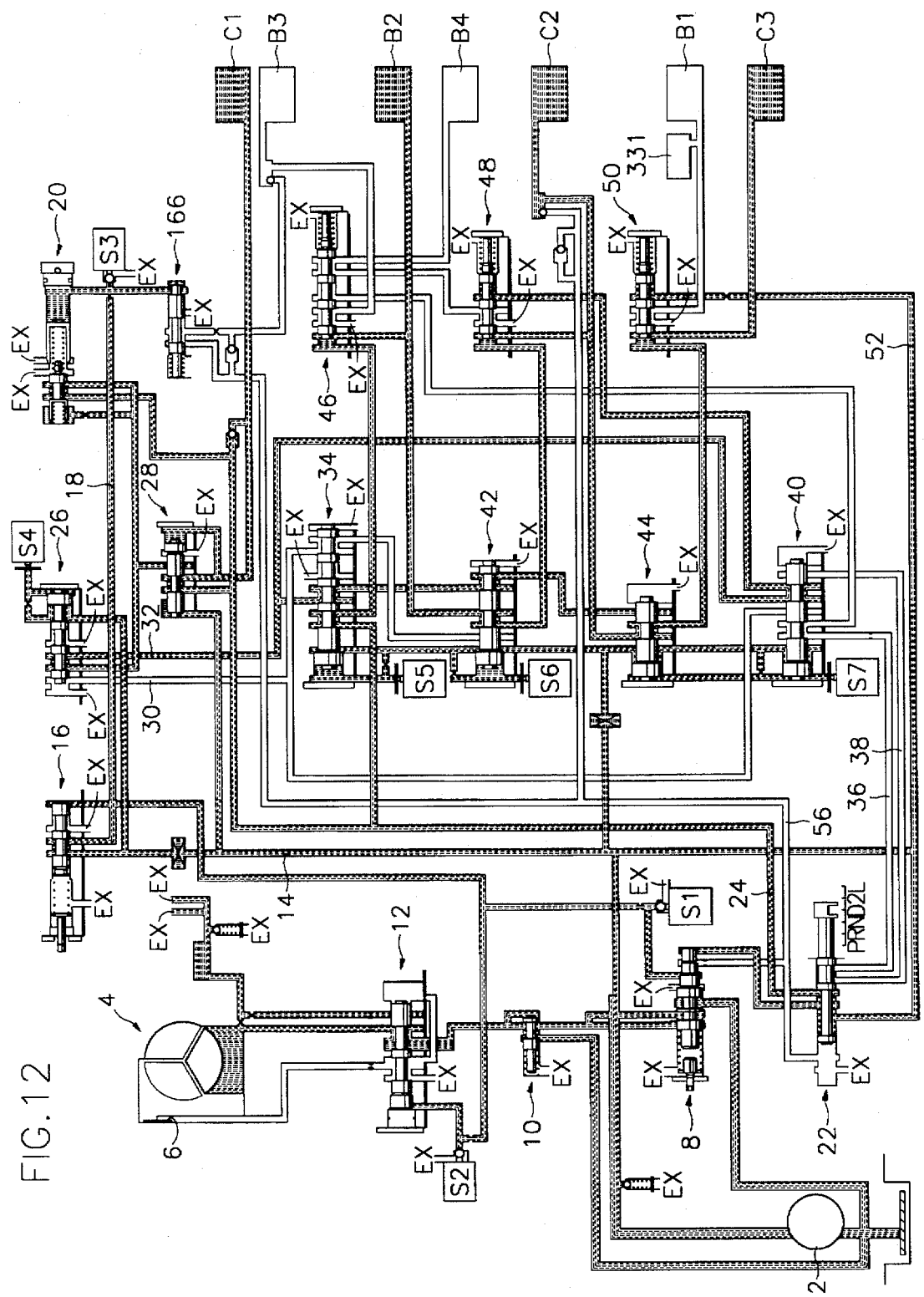
FIG. 12 is the hydraulic circuit diagram of FIG. 1 showing the location of hydraulic pressure during the fourth speed of the drive "D" range.

FIG. 12 is the hydraulic circuit diagram of FIG. 1 showing the location of hydraulic pressure during the fourth speed of the drive "D" range. When the speed of the vehicle is gradually increased in the third speed state, the fourth solenoid valve S4 is controlled to an ON state to displace the valve spool 26V of the control switch valve 26 toward the right.

By this operation, torque pressure coming through the first port 132 is fed through the second port 134 of the control switch valve 26 to the second port 184 of the first-to-second speed shift valve 34 along the second torque pressure passage 32.

At this point, since each of the valve spools 34V and 42V of the first-to-second speed shift valve 34 and the second-to-third speed shift valve 42 maintain their rightward state, the hydraulic pressure coming through the second port 184 is fed to the first port 234 of the third-to-fourth speed shift valve 44 via the valves 34 and 42.

Therefore, in the third-to-fourth speed shift valve 44, since the valve spool 44V is displaced toward the right as shown in FIG. 11, the first port 234 is connected to the sixth port 244 such that torque pressure coming through the first port 234 leaves through the seventh port 244 and is then fed to the first port 316 of the fourth clutch valve 50.

At this point, since torque pressure acts on the first land 324 of the valve spool 50V of the fourth clutch valve 50, the valve spool 50V is displaced toward the right while overcoming the elastic force of the spring 328 so that the first port 316 is connected with the second port 318 such that the torque pressure coming through the first port 316 is primarily fed to the fifth friction member C3 through the second port 318, starting the shift operation from the third speed to the fourth speed.

At this state, as the seventh solenoid valve S7 is controlled to an ON state, the valve spool 44V of the third-to-fourth speed shift valve 44 is displaced toward the left as shown in FIG. 12 to connect the second port 236 with the sixth port 244 so that the torque pressure which is being fed to the first port 234 is obstructed and the drive pressure coming through the second port 236 is fed to the friction member C3 through the sixth port 244.

That is, the friction member C3 is applied by the torque pressure in the initial shifting operation and is then applied by the drive pressure to thereby complete the control of the fourth speed.

As described above, when the friction members C1, B2, C2, and C3 are applied, power of the first shaft 404 is inputted to the first and second sun gears 410 and 412 through the second and third shafts 406 and 408, respectively.

The first and fourth nodes N1 and N4 become the locations of the input elements and the second node N2 becomes the output element. Therefore, the planet gear units constituting the first shift part 400 are locked, such that a vertical line connecting a straight line L7, which connects the reference level of the input speed line L1 of the first node N1 to the reference level of the input speed line L6 of the fourth node N4, to the second node N2 becomes the third output speed line L8 as is the third speed.

Accordingly, the speed ratio in the first shift part 400 is transmitted to the input gear 438 of the second shift part 402.

In the second shift part 402, since the friction member B1 is released and the friction member C3 is applied, the third ring gear 440 works as an input element at the fifth node N5, both the third sun gear 444 together with the third pinion gear 442 rotates by the friction member C3.

This state results in the third sun gear 444 becoming an input element at the seventh node N7, such that a line connecting a straight line L17, which connects the input speed line 18 of a fifth node N5 to an input speed line L16 of the seventh node N7 to the sixth node N6, becomes a fourth output speed line L18 of the second shift part 402.

That is, in the third speed, the seventh node N7 is a reacting point, but, in the fourth speed and the second speed and the seventh node N7 becomes the input point, such that the rotating force transmitted to the second shift part 402 is output.

The output of the second shift part 402 becomes the final fourth output speed in the transmission. This fourth output speed is finally reduced by gear ratio of the second output gear 446 and the final reduction gear 456 to drive a vehicle axle 458 through the differential 454 with the fourth speed.

When overdrive is in an OFF state, the fourth speed is not utilized.

Figure 13:
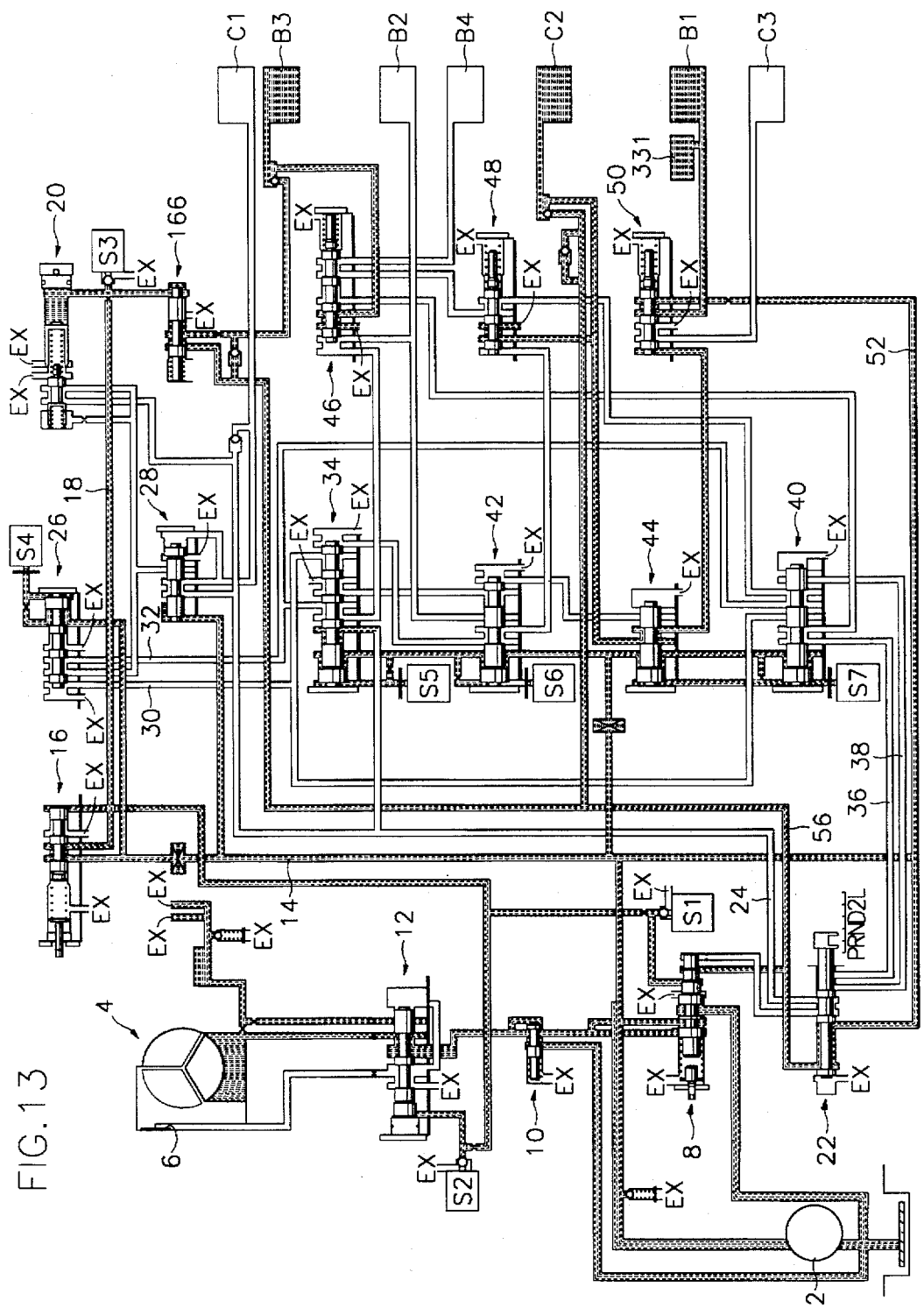
FIG. 13 is the hydraulic circuit diagram of FIG. 1 showing the location of hydraulic pressure during the reverse "R" range.

FIG. 13 is the hydraulic circuit diagram of FIG. 1 showing the location of hydraulic pressure during the reverse "R" range.

When the shift mode is changed to the reverse "R" range, part of the hydraulic pressure from the manual valve 22 is fed to the third port 174 of the N-R control valve 166 and is then fed to the sixth friction member B3 which is applied in the reverse "R" range. The rest of the hydraulic pressure is fed to the friction member C2.

Part of the hydraulic pressure within the line pressure passage 14 is fed to the first friction member B1 through the fourth clutch valve 50.

At this point, the N-R control valve 166 receives hydraulic pressure through the first and second ports 170 and 172. Since the third solenoid valve S3 is controlled to an OFF state, the valve spool 166V is displaced toward the left to connect the second port 172 to the third port 174, thereby feeding reverse pressure to the sixth friction member B3.

Therefore, in the reverse "R" range, the friction members B1, C2 and B3 are applied. As a result, power of the first shaft 404 is inputted to the second sun gear 412 through the third shaft 408.

The first sun gear 410 works as an input element at the first node N1, the second power transmission member 430 works as a reacting element at the node N3 by the friction member B3, and the fourth power transmission member 434 works as an output element at the second node N2. As a result, a vertical line connecting a straight line L3, which connects a reference level of the input speed line L6 of the fourth node L4 to the third node N3 to the second node N2, becomes a reverse output speed line L20.

The resultant reverse speed ratio is transmitted to the input gear 438 of the second shift part 402.

In the second shift part 402, the third ring gear 440 works as an input element at the fifth node N5, the third sun gear 444 works as a reaction element at the seventh node N7 by the friction member B1, and the fifth power transmission member 448 works as an output element at a sixth node N6. As a result, a line connecting a straight line L21, which connects the an input speed line l20 of a fifth node N5 to a seventh node N7 to a sixth node N6, becomes a reverse output speed line L22 of the second shift part 402.

The output of the second shift part 402 becomes the final second output speed in the transmission. This second output speed is finally reduced by gear ratio of the second output gear 446 and the final reduction gear 456, and a vehicle axle 458 is driven in the reverse direction.

Figure 14:
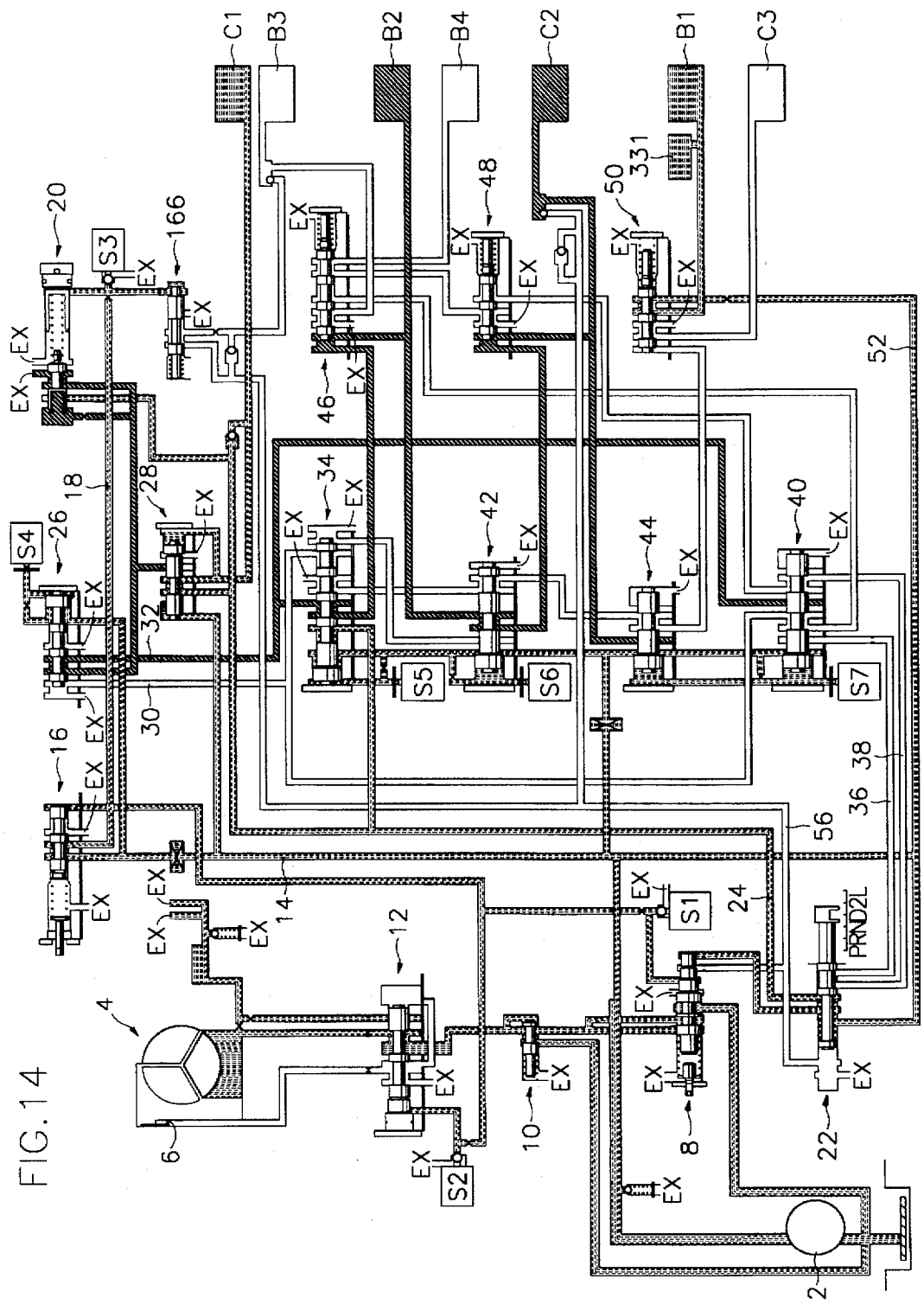
FIG. 14 is the hydraulic circuit diagram of FIG. 1 showing the location of hydraulic pressure during the skip-shift from the third speed to the first speed in a state where the vehicle is in a power ON mode.

FIG. 14 is the hydraulic circuit diagram of FIG. 1 showing the location of hydraulic pressure during the skip-shift from the third speed to the first speed in a state where the vehicle is in a power ON mode;

In the power ON mode, the 3–1 skip shift operation starts in a state where the friction members B1, C1, B2 and C2 are applied. That is, in the initial shift operation, both the fourth and fifth solenoid valves S4 and S5 are controlled to ON modes thereby translating the valve spool 26V to the right and the valve spool 34V to the left to change the drive pressure, which was being fed to the friction members B2 and C2, into torque pressure.

In addition, the third solenoid valve S3 is controlled to an ON state to interrupt the torque pressure (shown in diagonal lines) such that both the friction members B2 and C2 are released and the first and second one way clutches F1 and F2 are operated to control the shift operation. From the point that the shift operation is completed, the third solenoid valve S3 is controlled to an OFF state and the sixth and seventh solenoid valves S6 and S7 are controlled to an ON state.

When the 3–1 skip shift operation is completed by the above operation, the fourth solenoid valve S4 is controlled to an OFF state to feed the torque pressure to the first torque pressure passage 30, and the third solenoid valve S3 is controlled to an ON state to maintain the first speed state.

Figure 15:
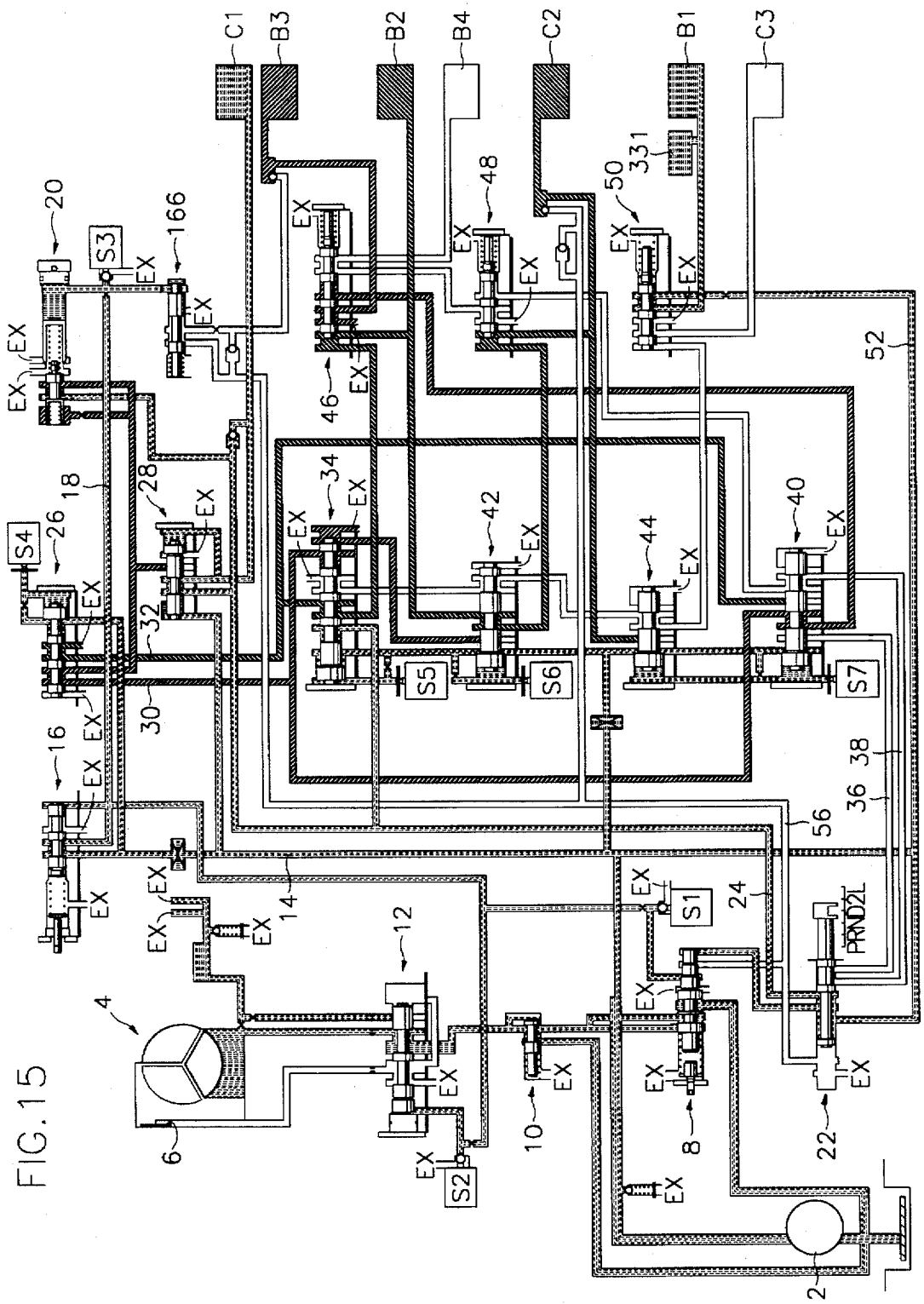
FIG. 15 is the hydraulic circuit diagram of FIG. 1 showing the location of hydraulic pressure during the skip-shift from the third speed to the first speed in a state where the vehicle is in a power OFF mode.

FIG. 15 is the hydraulic circuit diagram of FIG. 1 showing the location of hydraulic pressure during the skip-shift from the third speed to the first speed in a state where the vehicle is in a power OFF mode.

In the power OFF mode, the 3–1 skip shift operation starts in a state where the friction members B1, C1, B2 and C2 are applied. That is, in the initial shift operation, both the fourth and fifth solenoid valves S4 and S5 are controlled to ON states so as to change the drive pressure, which was being fed to the friction members B2 and C2, into torque pressure.

Next, the fourth solenoid valve S4 is controlled to an OFF state to interrupt the torque pressure which has been fed to the friction members C2 and B2, and to feed the torque pressure within the first torque pressure passage 30 to the friction member B3 via the manual shift valve 40 and the second clutch valve 46. In addition, the third solenoid valve S3, which is already controlled to an OFF state and is then controlled according to a duty ratio to operate the engine brake, thereby controlling engine RPM. This results from the one way clutch being free-wheeled in the power OFF mode.

And then, the sixth and seventh solenoid valves S6 and S7 are controlled to ON states such that hydraulic pressure which has been fed to the friction member B3 is exhausted through the manual shift valve 40 to release the friction member B3, wherein the engine brake is not operated and the 3–1 skip shift operation is completed.

Figure 16:
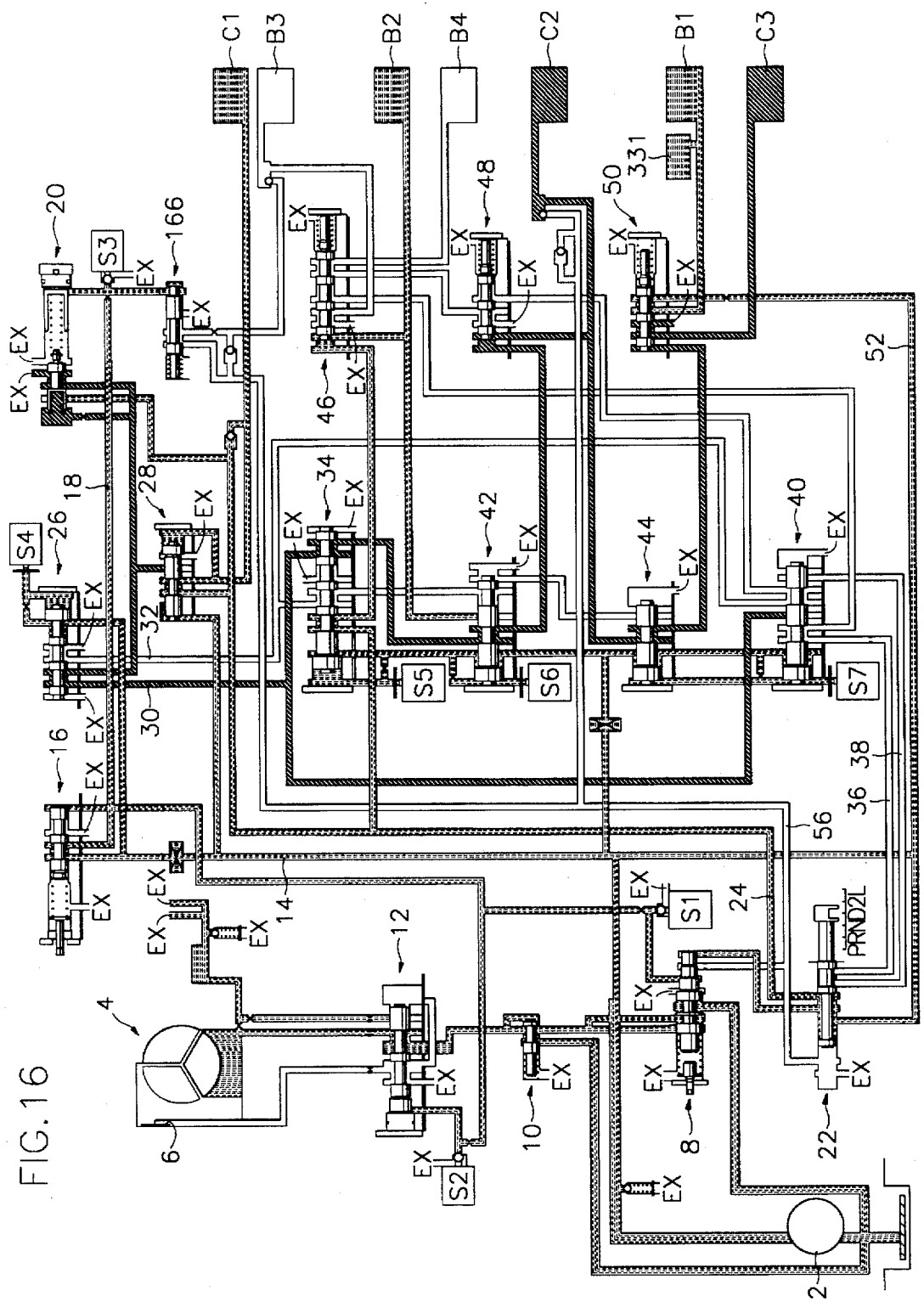
FIG. 16 is the hydraulic circuit diagram of FIG. 1 showing the location of hydraulic pressure during the skip-shift from the fourth speed to the second speed in a state where the vehicle is in a power ON mode.

FIG. 16 is the hydraulic circuit diagram of FIG. 1 showing the location of hydraulic pressure during the skip-shift from the fourth speed to the second speed in a state where the vehicle is in a power ON mode.

In the power ON mode, the 4–2 skip shift operation starts in a state where the friction members C1, B2, C2 and C3 are applied. That is, in the initial shift operation, the fourth solenoid valve S4 is controlled to an OFF state and the sixth solenoid valve S6 is turned on to change the drive pressure, which was being fed to the friction members C2, B2 and C3, into torque pressure. In addition, the fifth solenoid valve S6 is controlled to an ON state so as to interrupt the hydraulic pressure which is being fed to the friction members C2, B2 and C3, thereby releasing the friction members C2 and C3. The hydraulic pressure which is being fed to the friction member B1 is to be controlled by an accumulator 331.

At this point, when the friction members C2, B2, and C3 are released in turn the shift operation is controlled by the second and third one way clutches F2 and F3.

Then, at a point when the shift operation is completed, the fourth solenoid valve S4 is controlled to an ON state to release friction member B2, making a 2—2 shift operation state. The shift operation is completed by the second and third one way clutches F2 and F3, thereby being ready for the shift operation to stand by a 2—2 shift. Finally, the third solenoid valve S3 is controlled to change the torque pressure into higher drive pressure, thereby completing the 4–2 skip shift operation.

Figure 17:
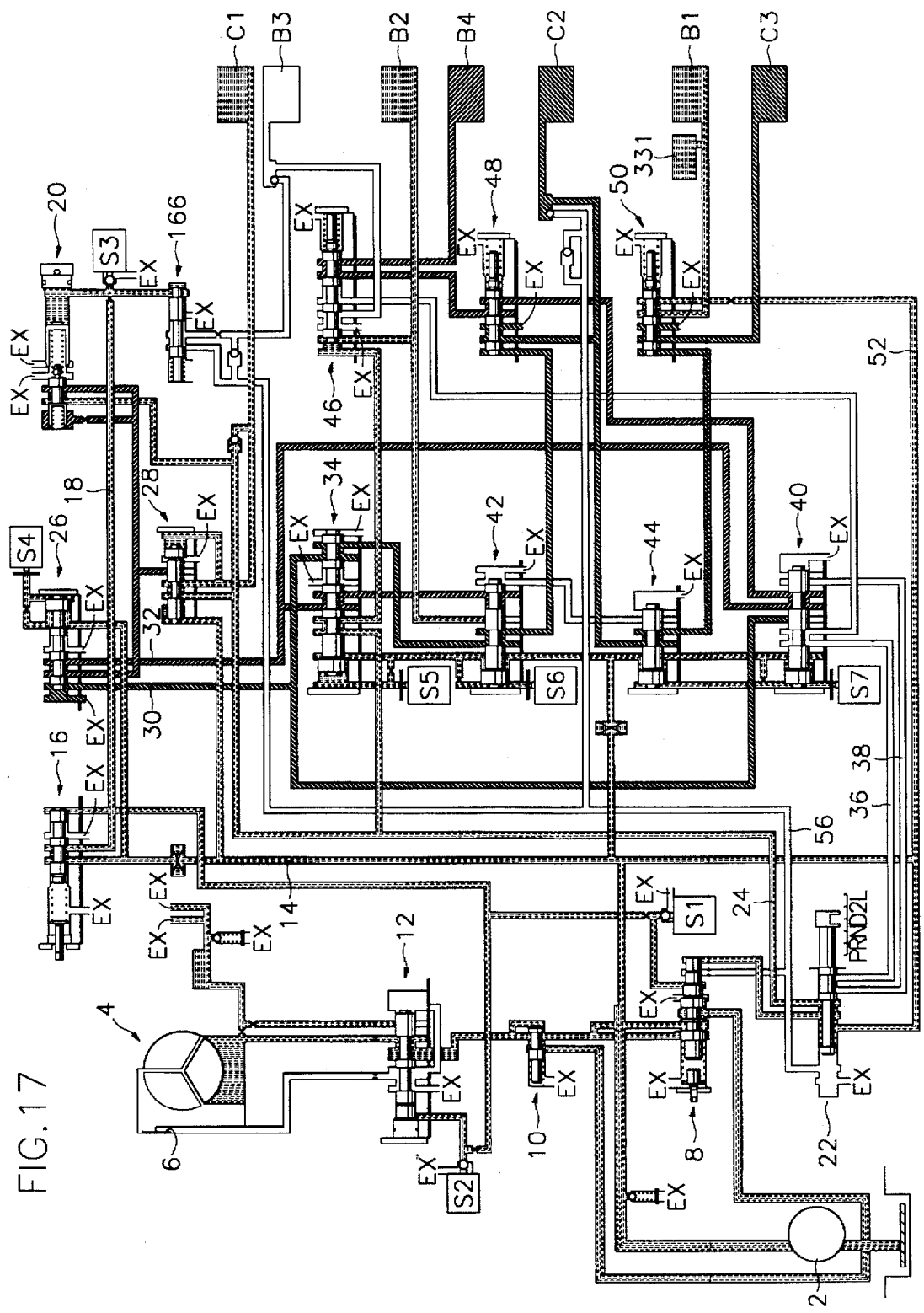
FIG. 17 is the hydraulic circuit diagram of FIG. 1 showing the location of hydraulic pressure during the skip-shift from the fourth speed to the second speed in a state where the vehicle is in a power OFF mode.

FIG. 17 is the hydraulic circuit diagram of FIG. 1 showing the location of hydraulic pressure during the skip-shift from the fourth speed to the second speed in a state where the vehicle is in a power OFF mode.

In the power OFF mode, the 4–2 skip shift operation starts in a state where the friction members C1, B2, C2 and C3 are applied. That is, in the initial shift operation, the fourth solenoid valve S4 is controlled to an OFF state so as to change the drive pressure, which was being fed to the friction members C2 and C3, into torque pressure. In addition, the sixth solenoid valve S6 is controlled to an OFF state so as to change the torque pressure in different torque pressure. At this point, hydraulic pressure of the friction member B1 is controlled by the accumulator 331 and, at the same time, the third solenoid valve S3 is controlled to an ON state so that the friction member B3 can be duty-controlled by the torque pressure.

In addition, the torque pressure of the friction member B3 is duty-controlled by the solenoid valve S3 to accomplish the second speed having the engine brake effect. And then, the torque pressure of the friction member B3 is changed to higher pressure by the seventh solenoid valve, thereby completing the 4–2 skip shift operation.

When the 4–2 skip shift operation is completed as described above, the seventh solenoid valve S7 is controlled to an OFF state to release hydraulic pressure of the sixth friction member B3, and the second speed without the engine brake effect is accomplished.

What is claimed is:

1. A hydraulic control system of an automatic transmission for a vehicle, comprising:

a line pressure control means for converting line pressure from a hydraulic pump into constant hydraulic pressure;

a torque pressure generating means for converting the constant hydraulic pressure fed from the line pressure control means via a manual valve into torque pressure in accordance with the operation of a transmission control unit;

a torque pressure switching means for switching the supply direction of the torque pressure fed from the torque pressure generating means in accordance with the operation of the transmission control unit; and a shift means for primarily feeding the torque pressure fed from the torque pressure switching means to friction members and for secondary feeding drive pressure to the friction members after converting the line pressure fed from the line pressure control means into the drive pressure.

2. The hydraulic control system according to claim 1, wherein the shift means comprises:

a first shift control part having a plurality of shift valves, which alternately feed torque pressure and drive pressure; and a second shift control part having a plurality of clutch valves, which feed torque pressure or drive pressure to the friction members or the shift valves.

3. The hydraulic control system according to claim 1, wherein the line pressure control means comprises a pressure regulator valve in response to a first solenoid valve controlled by the transmission control unit.

4. The hydraulic control system according to claim 1, wherein the torque pressure generating means comprises:

a torque control regulator valve for selectively generating the torque pressure in accordance with the operation of a second solenoid valve controlled by the transmission control unit; and a control switch valve for switching the supply of the torque pressure, generated from the torque control regulator valve, to the first shift control part.

5. The hydraulic control system according to claim 2, wherein the first shift control part comprises:

a first-to-second speed shift valve which, in a shifting operation from a second speed to a first speed, feeds in turn the torque pressure fed from the torque pressure switching means and the drive pressure fed from the manual valve to a friction member for the second speed in accordance with the operation of a third solenoid valve controlled by the transmission control unit;

a second-to-third speed shift valve which, in a shifting operation from the second speed to a third speed, feeds in turn the torque pressure fed from the first-to-second speed shift valve and part of the drive pressure which has been fed to the friction member for the second speed to a friction member for the third speed in accordance with the operation of a fourth solenoid valve controlled by the transmission control unit; and a third-to-fourth speed shift valve which, in a shifting operation from the third speed to a fourth speed, feeds in turn the torque pressure fed from the first-to-second speed shift valve and part of the drive pressure which has been fed to the friction member for the third speed to a friction member for the fourth speed in accordance with the operation of a fifth solenoid valve controlled by the transmission control unit.

6. A method for controlling hydraulic pressure of an automatic transmission for a vehicle, comprising the steps of:

determining a current speed ratio;

detecting a power ON/OFF state through an ON/OFF switch manipulated by a driver;

determining an opening of a throttle valve;

changing the pressure applied to friction members relating to the current speed ratio from drive pressure into torque pressure in response to a determined value of the power ON/OFF;

interrupting the torque pressure to release the friction members;

applying friction members relating to a speed ratio lower than the current speed ratio with the torque pressure; and changing the pressure applied to the friction members relating to the lower speed ratio from the torque pressure into the drive pressure, thereby completing a shift operation.

7. A method for controlling a skip shifting operation from a third speed to a first speed in a state where a mode setting is in a power ON state, comprising the steps of:

changing pressure applied to a friction member for a third speed from drive pressure into torque pressure by controlling first and second solenoid valves to ON states in the third speed state;

interrupting the torque pressure fed to the friction members for the third speed to release the friction member by controlling a third solenoid valve to an ON state;

controlling again the third solenoid valve to an OFF state and concurrently controlling fourth and fifth solenoid valves to ON states;

controlling the first solenoid valve to an OFF state for a predetermined period to feed torque pressure to a first torque pressure passage and controlling the third solenoid valve to an ON state, thereby completing the skip shifting operating from the third speed to the first speed.

8. A method for controlling a skip shifting operation from a third speed to a first speed in a state where a mode setting is in a power OFF state, comprising the steps of:

changing pressure applied to friction members for a third speed from drive pressure into torque pressure by controlling first and second solenoid valves to ON states in the third speed state;

interrupting the torque pressure fed to the friction members for the third speed to release the friction member by controlling the first solenoid valve to an OFF state and feeding torque pressure within a first torque pressure passage via a manual shift valve and a second clutch valve to a friction member for an engine brake;

controlling a third solenoid valve to an OFF state;

controlling the third solenoid valve according to a duty ratio to increase the torque pressure of the friction member, thereby completing the skip shifting operation from the third speed to the first speed wherein the engine brake is operated; and releasing the friction member for the engine brake by exhausting the hydraulic pressure fed to the friction member for the engine brake through the manual shift valve by controlling fourth and fifth solenoid valves to ON states, thereby completing the skip shifting operation from the third speed to the first speed wherein the engine brake is not operated;

concurrently controlling fourth and fifth solenoid valves to ON states;

controlling the first solenoid valve to an OFF state for a predetermined period to feed torque pressure to a first torque pressure passage and controlling the third solenoid valve to an ON state, thereby completing the skip shifting operating from the third speed to the first speed.

9. A method for controlling a skip shifting operation from a fourth speed to a second speed in a state where a mode setting is in a power ON state, comprising the steps of:

changing pressure applied to friction members for a fourth speed from drive pressure into torque pressure by controlling a first solenoid valve to an OFF state in the fourth speed state;

interrupting the torque pressure fed to the friction members for the fourth speed to release the friction members by controlling a second solenoid valve to an ON state and controlling hydraulic pressure of a friction member for a second speed by means of an accumulator;

changing the torque pressure into a second torque pressure by controlling the first solenoid valve to an ON state, thereby being ready for the second speed; and increasing the second torque pressure by controlling a third solenoid valve, thereby completing the skip shifting operation from the fourth speed to the second speed.

10. A method for controlling a skip shifting operation from a fourth speed to a second speed in a state where a mode setting is in a power OFF state, comprising the steps of:

changing pressure applied to friction members for a fourth speed from drive pressure into torque pressure by controlling a first solenoid valve to an OFF state in the fourth speed state;

changing the torque pressure into a second torque pressure by controlling the second solenoid valve to an OFF state, controlling a friction member for all speeds with an accumulator, and applying a friction member for the second speed by controlling a third solenoid valve to an ON state;

controlling the second torque pressure fed to the friction member for the second speed by a duty control of a fourth solenoid valve wherein an engine brake is operated; and increasing the second torque pressure by controlling a fifth solenoid valve, thereby completing the skip shifting operation from the fourth speed to the second speed.

11. A hydraulic control system of an automatic transmission for a vehicle, comprising:

line pressure control means for converting line pressure from a hydraulic pump into drive pressure;

torque pressure generating means for converting the drive pressure into torque pressure; and shift means for alternatively feeding the torque pressure and the drive pressure to friction members in the transmission during a shift operation.

12. The hydraulic control system according to claim 11 wherein the line pressure control means comprises a pressure regulator valve responsive to a solenoid valve controlled by a transmission control unit.

13. The hydraulic control system according to claim 11 wherein the torque pressure generating means comprises:

a torque control regulator valve for selectively generating the torque pressure in accordance with the operation of a solenoid valve controlled by a transmission control unit; and a control switch valve for switching the supply of the torque pressure, generated from the torque control regulator valve, to the shift means.

14. The hydraulic control system according to claim 11 wherein the shift means comprises:

a first-to-second speed shift valve which, in a shifting operation from a second speed to a first speed, feeds in turn the torque pressure from the torque pressure and the drive pressure to a friction member for the second speed in accordance with the operation of a first solenoid valve controlled by a transmission control unit;

a second-to-third speed shift valve which, in a shifting operation from the second speed to a third speed, feeds in turn the torque pressure from the first-to-second speed shift valve and part of the drive pressure which has been fed to the friction member for the second speed to a friction member for the third speed in accordance with the operation of a second solenoid valve controlled by the transmission control unit; and a third-to-fourth speed shift valve which, in a shifting operation from the third speed to a fourth speed, feeds in turn the torque pressure fed from the first-to-second speed shift valve and part of the drive pressure which has been fed to the friction member for the third speed to a friction member for the fourth speed in accordance with the operation of a third solenoid valve controlled by the transmission control unit.

* * * * *

UNITED STATES PATENT AND TRADEMARK OFFICE
CERTIFICATE OF CORRECTION

PATENT NO. : 5,749,806
DATED : May 12, 1998
INVENTOR(S) : Jae Duk Jang; Kibeen Lim It is certified that error appears in the above-identified patent and that said Letters Patent is hereby corrected as shown below:

On the title page,

Item [75] Inventors:, the inventor's name "Jae Dirk Jang" should read
-- Jae Duk Jang --.
Column 3, line 32, after "driven by" delete "of".
Column 6, line 55, after "coming through each" insert -- of --.
Column 10, line 19, after "first port 54" insert "and".
Column 15, line 45, after "connects the" delete "an".
Column 17, line 64, change "according to claim 1," to
-- according to claim 2, --.

Signed and Sealed this

Twenty-ninth Day of June, 1999

Attest:

Q. TODD DICKINSON

*Attesting Officer*  *Acting Commissioner of Patents and Trademarks*